(12) United States Patent
Iftime et al.

(10) Patent No.: US 6,994,801 B2
(45) Date of Patent: Feb. 7, 2006

(54) COMPOUNDS OF FORMULA (4) TO STABILIZE LIQUID CRYSTAL DOMAINS

(75) Inventors: Gabriel Iftime, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 30 days.

(21) Appl. No.: 10/828,973

(22) Filed: Apr. 21, 2004

(65) Prior Publication Data

US 2004/0195547 A1 Oct. 7, 2004

Related U.S. Application Data

(62) Division of application No. 10/319,874, filed on Dec. 13, 2002, now Pat. No. 6,905,633.

(51) Int. Cl.
*C09K 19/52* (2006.01)
*C09K 19/54* (2006.01)

(52) U.S. Cl. ............................. 252/299.01; 252/299.5

(58) Field of Classification Search ........... 252/299.01, 252/299.5
See application file for complete search history.

(56) References Cited

U.S. PATENT DOCUMENTS

| | | | |
|---|---|---|---|
| 4,022,706 A | 5/1977 | Davis | 252/299 |
| 4,296,631 A | 10/1981 | Fergason | |
| 5,608,010 A | 3/1997 | Tamura et al. | 525/328.2 |
| 5,625,477 A | 4/1997 | Wu et al. | |
| 5,661,533 A | 8/1997 | Wu et al. | |
| 5,691,795 A | 11/1997 | Doane et al. | |
| 5,698,359 A | 12/1997 | Yanus et al. | 430/132 |
| 5,720,900 A * | 2/1998 | Parri et al. | 252/299.66 |
| 5,847,798 A | 12/1998 | Yang et al. | |
| 5,959,707 A | 9/1999 | Murai et al. | |
| 6,051,639 A * | 4/2000 | Mehl et al. | 524/205 |
| 6,061,107 A | 5/2000 | Yang et al. | |
| 6,103,431 A | 8/2000 | Tamaoki et al. | |
| 6,115,017 A | 9/2000 | Mikami et al. | 345/92 |
| 6,277,451 B1 * | 8/2001 | Mehl et al. | 428/1.1 |
| 6,300,454 B1 * | 10/2001 | Hanelt et al. | 528/27 |
| 6,312,618 B1 * | 11/2001 | Wu et al. | 252/299.6 |
| 6,326,066 B1 * | 12/2001 | Poetsch et al. | 428/1.1 |
| 6,333,081 B1 | 12/2001 | Horikiri et al. | |
| 6,511,612 B1 * | 1/2003 | Hall et al. | 252/299.01 |
| 6,767,480 B2 * | 7/2004 | Iftime et al. | 252/299.01 |
| 6,849,204 B2 * | 2/2005 | Iftime et al. | 252/299.01 |
| 6,858,266 B2 * | 2/2005 | Iftime et al. | 428/1.1 |
| 6,905,633 B2 * | 6/2005 | Iftime et al. | 252/299.01 |

FOREIGN PATENT DOCUMENTS

EP 0 003 872 1/1979

OTHER PUBLICATIONS

D.K. Yang et al., "Polymer-stabilized Cholesteric Textures," *Liquid Crystals in Complex Geometries Formed by polymer and porous networks*, pp. 103-142 (Published by Taylor & Francis Ltd. 1996).
H. Yuan, "Bistable Reflective Cholesteric Displays," *Liquid Crystals in Complex Geometies Formed by polymer and porous networks*, pp. 265-280 (Published by Taylor & Francis Ltd. 1996).
J. Kim et al., "Reflective Displays from Polymer-Stabilized Cholesteric Textures," SID, p. 802-805 (1998).
D.-K. Yang et al., "Cholesteric liquid crystal/polymer disperson for haze-free light shutters," *Appl. Phys. Lett.*, vol. 60, pp. 3102-3104 (Jun. 1992).
J. Nie et al., "Photocuring of mono- and di-functional (meth)acrylates with tris[2-(acryloyloxy)ethyl]isocyanurate," *European Polymer Journal*, vol. 35, pp. 1491-1500 (1999).
W.D. Cook, "Photopolymerization kinetics of dimethacrylates using the camphorquinone/amine initiator system," *Polymer*, vol. 33, pp. 600-609 (1992).
I. Dierking, "Polymer Network-Stabilized Liquid Crystals," *Adv. Mater.*, vol. 12, pp. 167-181 (2000).
D.-K. Yang et al., "Control of reflectivity and bistability in displays using cholesteric liquid crystals," *J. Appl. Phys.*, vol. 76, pp. 1331-1333 (1994).
E. Korenic et al., "Cholesteric Liquid Crystal Flakes—A New Form of Domain," *LLE Review*, vol. 74, pp. 139-149 (1998).
N. Tamaoki et al., "Rewritable Full-Color Recording in a Photon Mode," *Adv. Mater.*, vol. 12, pp. 94-97 (2000).
W. Shuddeboom et al., "Excited-State Dipole Moments of Dual Fluorescent 4-(Dialkylamino)benzonitriles. Influence of Alkyl Chain Length and Effective Solvent Polarity," *J. Phys. Chem.*, vol. 96, pp. 10809-10819 (1992).

(Continued)

*Primary Examiner*—Shean C. Wu
(74) *Attorney, Agent, or Firm*—Zosan Soong

(57) ABSTRACT

A compound having formula (4)

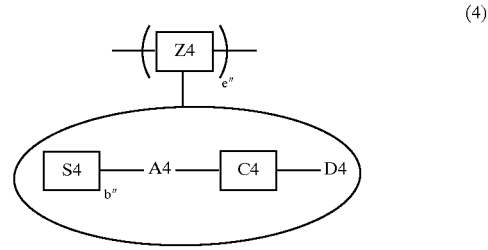

(4)

wherein: D4 is an electron donor moiety; C4 is a conjugated bridging moiety; A4 is an electron acceptor moiety; S4 is a hydrocarbon, a heterocyclic moiety, or a hetero-acyclic moiety; b" is an integer; Z4 is a polymerizable moiety; and e" is the degree of polymerization.

1 Claim, 4 Drawing Sheets

OTHER PUBLICATIONS

Gabriel Iftime et al., U.S. Appl. No. 10/319,870, titled "Domain Size Controlled Liquid Crystals", filed Dec. 13, 2002.

Gabriel Iftime et al., U.S. Appl. No. 10/319,890, titled "Compounds of Formula (1) Stabilize Liquid Crystal Domains", filed Dec. 13, 2002.

Gabriel Iftime et al., U.S. Appl. No. 10/319,874, titled "Compounds of Formulas (3) and (4) to Stabilize Liquid Crystal Domains", filed Dec. 13, 2002.

Gabriel Iftime et al., U.S. Appl. No. 10/319,876, titled "Compounds of Formulas (5) and (6) to Stabilize Liquid Crystal Domains", filed Dec. 13, 2002.

Gabriel Iftime et al., U.S. Appl. No. 10/319,918, titled "Liquid Crystal Compositions Including Dispersant", filed Dec. 13, 2002.

Gabriel Iftime et al., U.S. Appl. No. 10/319,917, titled "Liquid Crystal Compositions Including Non-Dipolar Monomer", filed Dec. 13, 2002.

Gabriel Iftime et al., U.S. Appl. No. 10/319,878, titled "Compounds of Formula (2) to Stabilize Liquid Crystal Domains", filed Dec. 13, 2002.

* cited by examiner

US 6,994,801 B2

COMPOUNDS OF FORMULA (4) TO STABILIZE LIQUID CRYSTAL DOMAINS

CROSS REFERENCE TO RELATED APPLICATIONS

This application is a divisional application of U.S. application Ser. No. 10/319,874 (filing date Dec. 13, 2002 now U.S. Pat. No. 6,905,633) from which priority is claimed, the disclosure of which is totally incorporated herein by reference.

BACKGROUND OF THE INVENTION

Liquid crystal displays continue to be a dominant technology for flat panel displays. Liquid crystal displays that do not use polarizers, are reflective, and have intrinsic display memory are desirable in many situations. A number of reflective cholesteric liquid crystal displays has recently been developed. But these conventional reflective cholesteric liquid crystal displays typically suffer from one or more of the following deficiencies: switching between two states (e.g., planar state and focal-conic state) where one or both states are not stable under zero electric field; difficulty in fabricating black and white displays since one of the states must be colored (i.e., a color other than white or black); viewing angle dependency; poor light reflectivity; and poor contrast between the two states. There is a need, addressed by the present invention, to minimize or avoid one or more of above described problems.

The following documents may be relevant to the present invention:

Yang et al., U.S. Pat. No. 6,061,107.
Tamaoki et al., U.S. Pat. No. 6,103,431.
Yang et al., U.S. Pat. No. 5,847,798.
Doane et al., U.S. Pat. No. 5,691,795.
Wu et al., U.S. Pat. No. 5,625,477.
Wu et al., U.S. Pat. No. 5,661,533.
D. K. Yang et al., "Polymer-stabilized Cholesteric Textures," *Liquid Crystals in Complex Geometries Formed by polymer and porous networks,* pp. 103–142 (Published by Taylor & Francis Ltd. 1996).
H. Yuan, "Bistable Reflective Cholesteric Displays," *Liquid Crystals in Complex Geometries Formed by polymer and porous networks,* pp. 265–280 (Published by Taylor & Francis Ltd. 1996).
J. Kim et al., "White Reflective Displays from Polymer-Stabilized Cholesteric Textures," SID, p. 802–805 (1998).
D.-K. Yang et al., "Cholesteric liquid crystal/polymer dispersion for haze-free light shutters," *Appl. Phys. Lett.,* Vol. 60, pp. 3102–3104 (June 1992).
J. Nie et al., "Photocuring of mono- and di-functional (meth)acrylates with tris [2-(acryloyloxy)ethyl]isocyanurate," *European Polymer Journal,* Vol. 35, pp. 1491–1500 (1999).
W. D. Cook, "Photopolymerization kinetics of dimethacrylates using the camphorquinone/amine initiator system," *Polymer,* Vol. 33, pp. 600–609 (1992).
I. Dierking, "Polymer Network-Stabilized Liquid Crystals," *Adv. Mater.,* Vol. 12, pp. 167–181 (2000).
D.-K. Yang et al., "Control of reflectivity and bistability in displays using cholesteric liquid crystals," *J. Appl. Phys.,* Vol. 76, pp. 1331–1333 (1994).
E. Korenic et al., "Cholesteric Liquid Crystal Flakes—A New Form of Domain," *LLE Review,* Vol. 74, pp. 139–149 (1998).
N. Tamaoki et al., "Rewritable Full-Color Recording in a Photon Mode," *Adv. Mater.,* Vol. 12, pp. 94–97 (2000).
W. Schuddeboom et al., "Excited-State Dipole Moments of Dual Fluorescent 4-(Dialkylamino)benzonitriles. Influence of Alkyl Chain Length and Effective Solvent Polarity," *J. Phys. Chem.,* Vol. 96, pp. 10809–10819 (1992). The compound of formula 1-I described in the present application is disclosed in Schuddeboom et al.

SUMMARY OF THE INVENTION

The present invention is accomplished in embodiments by providing a device comprising:

a liquid crystal composition including a liquid crystal and a liquid crystal domain stabilizing compound, wherein the liquid crystal composition is switchable between a strongly scattering state of a first plurality of smaller liquid crystal domains that strongly scatters a predetermined light and a weakly scattering state of a second plurality of larger liquid crystal domains that weakly scatters the predetermined light; and a liquid crystal containment structure defining a space for the liquid crystal composition.

In further embodiments, there is provided a method comprising:

providing a liquid crystal composition including a liquid crystal and a liquid crystal domain stabilizing compound, wherein the liquid crystal composition is switchable between a strongly scattering state of a first plurality of smaller liquid crystal domains that strongly scatters a predetermined light and a weakly scattering state of a second plurality of larger liquid crystal domains that weakly scatters the predetermined light;

changing the weakly scattering state to the strongly scattering state by applying a first electric field to yield an unstable state of a single liquid crystal domain and then reducing the first electric field to a strongly scattering state inducing level to yield the strongly scattering state; and changing the strongly scattering state to the weakly scattering state by applying a second electric field weaker than the first electric field but stronger than the strongly scattering state inducing level.

In embodiments of the present invention, the liquid crystal in both the smaller liquid crystal domains and the larger liquid crystal domains possesses helical axes that are randomly oriented.

In embodiments, there is a liquid crystal composition comprising:

(a) a liquid crystal; and
(b) a polymerized liquid crystal domain stabilizing compound comprising a dipolar monomer and a non-dipolar monomer.

In embodiments, there is a process comprising:

(a) forming a composition including a dipolar monomer and a non-dipolar monomer and polymerizing the dipolar monomer and the non-dipolar monomer to result in a polymerized liquid crystal domain stabilizing compound; and
(b) adding a liquid crystal to the composition at any time such as before, during, or subsequent to the polymerizing the dipolar monomer and the non-dipolar monomer.

A compound having formula (3)

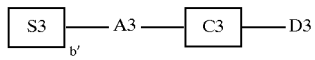

(3)

wherein:
D3 is an electron donor moiety;
C3 is a conjugated bridging moiety;
A3 is an electron acceptor moiety;
S3 is a hydrocarbon, a heterocyclic moiety, or a heteroacyclic moiety; and
b' is an integer.

A composition comprised of a liquid crystal and a compound having formula (3)

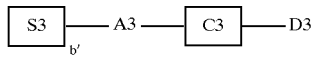

(3)

wherein:
D3 is an electron donor moiety;
C3 is a conjugated bridging moiety;
A3 is an electron acceptor moiety;
S3 is a liquid crystal compatibilizing moiety; and
b' is an integer.

A compound having formula (4)

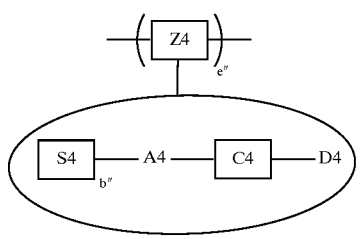

(4)

wherein:
D4 is an electron donor moiety;
C4 is a conjugated bridging moiety;
A4 is an electron acceptor moiety;
S4 is a hydrocarbon, a heterocyclic moiety, or a heteroacyclic moiety;
b" is an integer;
Z4 is a polymerizable moiety; and
e" is the degree of polymerization.

A composition comprised of a liquid crystal and a compound having formula

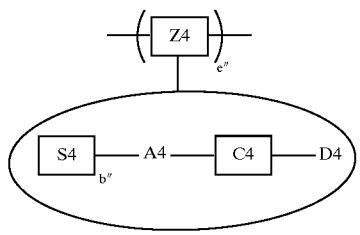

(4)

wherein:
D4 is an electron donor moiety;
C4 is a conjugated bridging moiety;
A4 is an electron acceptor moiety;
S4 is a liquid crystal compatibilizing moiety;
b" is an integer;
Z4 is a polymerizable moiety; and
e" is the degree of polymerization.

BRIEF DESCRIPTION OF THE DRAWINGS

Other aspects of the present invention will become apparent as the following description proceeds and upon reference to the Figures which represent exemplary embodiments.

Unless otherwise noted, the same reference numeral in different Figures refers to the same or similar feature.

DETAILED DESCRIPTION

Figure 1:
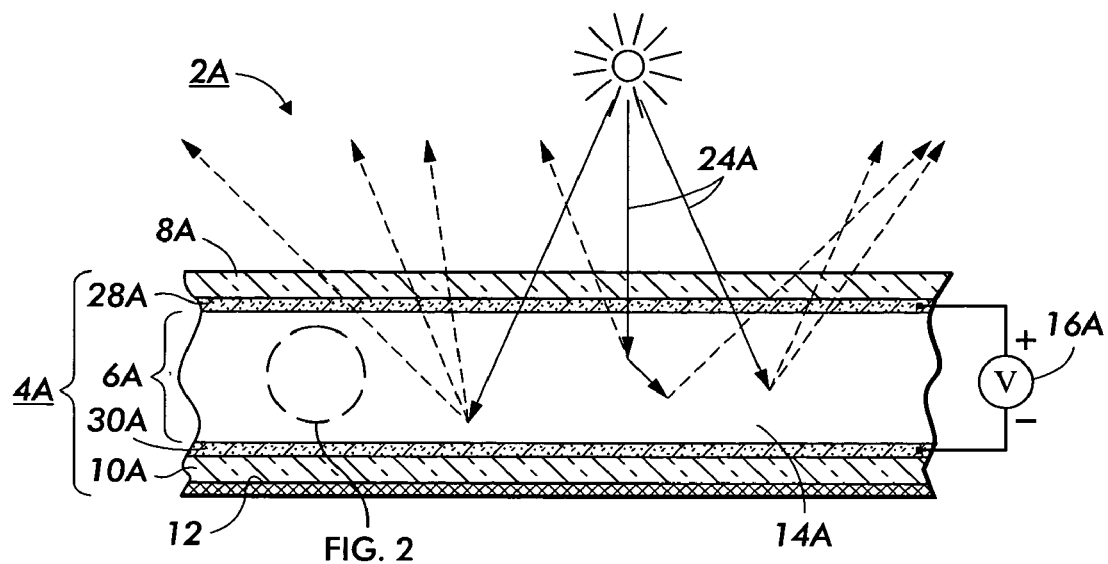
FIG. 1 depicts an elevational simplified view of a first embodiment of the present device where the device exhibits a strongly scattering state.

Unless otherwise noted the term "alkyl" encompasses both a straight chain alkyl and a branched alkyl.

The liquid crystal composition includes a liquid crystal and a liquid crystal domain stabilizing compound.

I. Liquid Crystals

The liquid crystal may be any liquid crystal capable of forming a plurality of liquid crystal domains. In embodiments, the liquid crystal may be for example a chiral nematic (i.e., cholesteric) liquid crystal or a nematic liquid crystal. The liquid crystal may be a single compound or a mixture of two or more different compounds.

A. Nematic Liquid Crystals

Nematic liquid crystals with positive dielectric anisotropy are composed of a hard core made of a polyaromatic ring and a flexible moiety composed of a hydrocarbon group. In embodiments, the nematic liquid crystals suitable for the purposes of this invention are composed of a hard core made of two or more monocyclic aromatic groups and a flexible moiety made of an alkyl group of variable length, which may be optionally substituted. Most often, commercially available nematic liquid crystals are mixtures of nematic molecules.

In a second main type, the cholesteric liquid crystal can be made from a mixture of a nematic liquid crystal and a chiral material in an amount sufficient to generate a desired pitch length. Any chiral material soluble into a nematic liquid crystal is suitable for the purposes of this invention as long as it is of high enough enantiomeric or diastereoisomeric purity and it has high enough twisting power. High performance chiral materials are commercially available at Merck, for example ZLI4571, ZLI4572 (R1011), S811 and R811. In particular, R1011 and S811 may include compounds with the structural formulas depicted below.

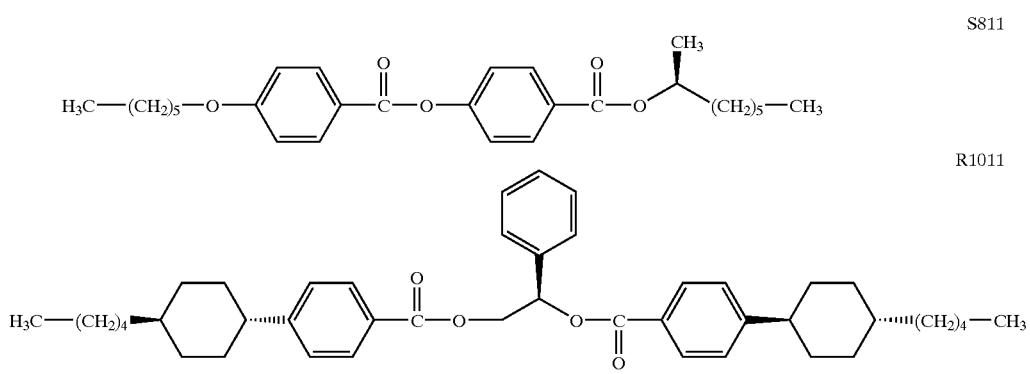

Many suitable nematic liquid crystals are mixtures of alkyl-biphenylnitrile or alkyl-terphenylnitrile molecules and are commercially available and would be known to those of ordinary skill in the art in view of this disclosure. Exemplary examples include for example nematic liquid crystal BL mixtures available at EM Industries, Inc., BL001 (E7), BL002 (E8), BL033 (version of BL002) and BL087, and 5CB (commercially available at Sigma-Aldrich). There is provided below a structural formula for nematic liquid crystals compounds that are included in the commercially available E7 and of 5CB:

In a third main type, the cholesteric liquid crystal can be a nematic liquid crystal single compound which is also chiral (hence the name of chiral nematic liquid crystal). Optionally, the chiral nematic liquid crystal single compound can be mixed with a chiral nematic liquid crystal mixture or with a chiral non-liquid crystal material to tune the helical pitch to the desired value. A few examples of such single compound chiral nematic liquid crystals are shown below.

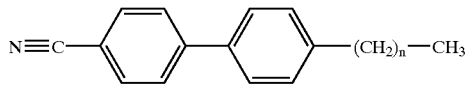

where E7 is a mixture of compounds where n is 4, 6, and 7, and

5CB is a single compound where n is 5.

B. Cholesteric Liquid Crystals

Cholesteric liquid crystals possessing a positive dielectric anisotropy with a helical pitch chosen to reflect for example in the IR or Near IR regions are suitable for the purposes of the invention. The cholesteric liquid crystals generally can be categorized into three main types.

In a first main type, the cholesteric liquid crystal can be a mixture of a cholesteric liquid crystal mixture and a nematic liquid crystal in an amount sufficient to produce desired helical pitch length. Suitable cholesteric liquid crystal mixtures include for example BL mixtures available from EM Industries, Inc. (BL088, BL 90, BL94 and BL108 as a few examples). The helical pitch is tuned to the desired range by mixing this cholesteric liquid crystal mixture with a nematic liquid crystal described herein.

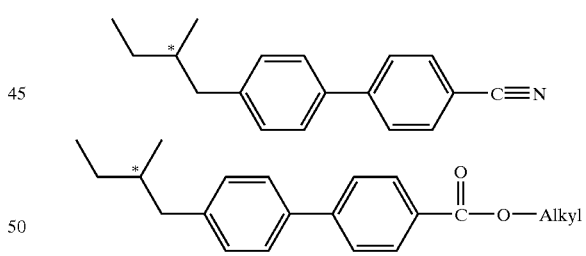

II. Liquid Crystal Domain Stabilizing Compounds

The liquid crystal domain stabilizing compound encompasses any compound that: (1) induces (or allows) (along with an applied electric field) the switching between the smaller liquid crystal domains and larger liquid crystal domains; and (2) maintains the liquid crystal domain size after switching when the electric field is zero. It is believed that the liquid crystal domain stabilizing compound places itself mostly at the boundaries of the liquid crystal domains, and only a low percentage of it if any is placed within the liquid crystal helices. In embodiments, the liquid crystal domain stabilizing compound is an organic dipolar compound such as those illustrated herein. An organic dipolar compound as illustrated in the formulas (1) through (6) is a conjugated structural unit possessing an electron acceptor group and an electron acceptor group. This structural unit has a permanent dipole moment large enough so that it can be rotated by an applied electric field.

Liquid Crystal Domain Stabilizing Compounds of Formula (1) through Formula (6)

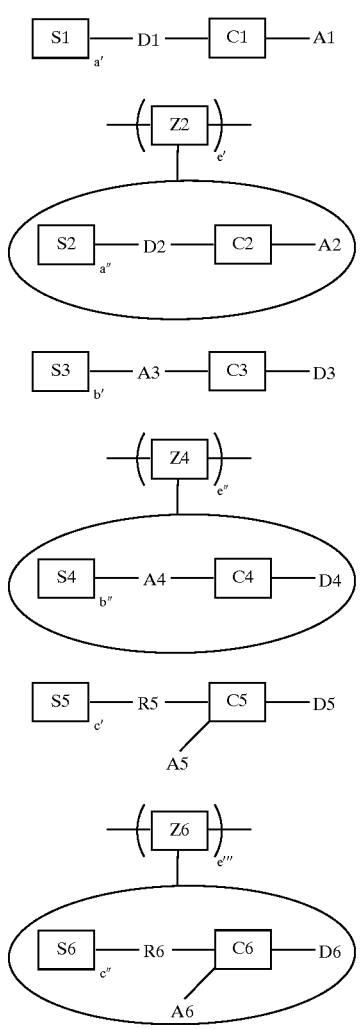

Formulas (1) through (6) schematically represent useful dipolar compounds suitable for the purpose of this disclosure. While the different moieties are connected schematically through single bonds, they may possess single, double or triple bonds. "Small molecule" liquid crystal domain stabilizing compounds are exemplified by compounds corresponding to formulas (1), (3), and (5). "Macromolecule" liquid crystal domain stabilizing compounds which are an oligomer/polymer are exemplified by compounds corresponding to formulas (2), (4), and (6). A polymerized liquid crystal domain stabilizing compound comprising a dipolar monomer and a non-dipolar monomer (discussed herein) is also considered a "macromolecule" liquid crystal domain stabilizing compound. In embodiments, the liquid crystal domain stabilizing compounds may absorb at a portion of the spectrum that is compatible with the operation of the photonic device; for instance, where the photonic device is a display device, the liquid crystal domain stabilizing compounds may absorb in the UV or slightly in the visible range. In embodiments, the liquid crystal domain stabilizing compounds are colorless having little absorbance for example in the visible range so that when dissolved in the liquid crystal composition in a few percents, a thin film of such a liquid crystal composition appears colorless.

The electron donor moiety (D1 through D6) may be any suitable atom or group capable of donating electrons, which in embodiments according to Hammett equation may possess a negative Hammett constant ($\sigma p$). In embodiments, the electron donor moiety (D1 through D6) is an atom which may require one or more additional moieties in order to fulfill its valence requirements (for example, a nitrogen atom has three valences). In embodiments, the electron donor moiety (D1 through D6) may be selected from the group consisting of:

(a) an atom selected from the group consisting of N, O, S, P, Cl, Br, and I, where the valence of the atom is satisfied by bonding with the liquid crystal compatibilizing moiety (S1 through S6) and/or conjugated bridging moiety (C1 through C6) and optionally with the polymerizable moiety (Z2, Z4, Z6);

(b) an atom selected from the group consisting of N, O, S, and P bonded to the liquid crystal compatibilizing moiety (S1 through S6) and/or conjugated bridging moiety (C1 through C6) and optionally with the polymerizable moiety (Z2, Z4, Z6), where the atom also is bonded to at least one other moiety to satisfy the valence of the atom;

(c) ferrocenyl;

(d) azulenyl; and (e) at least one aromatic heterocyclic ring having from about 5 to about 30 atoms (referring to number of carbon atoms and heteroatom(s)) where the heteroatom is for example oxygen (like for example furan, benzofuran, dibenzofuran), sulfur (like for example 1,4-dithiin, benzo-1,4-dithiin, dibenzo-1,4-dithiin, tetrathiafulvalene, thiophen, benzothiophen, dibenzothiophen), or nitrogen (like for example pyrrole, indole, carbazole, pyrazole, imidazol), selenium (like for example selenophen, benzoselenophen, dibenzoselenophen), and tellurium (like for example tellurophen, benzotellurophen, dibenzotellurophen).

In embodiments, the electron donor moiety (D1, D2) is selected from the group consisting of:

(a) an atom selected from the group consisting of N, O, S, and P, where the valence of the atom is satisfied by bonding with S1/S2 and C1/C2;

(b) an atom selected from the group consisting of N, O, S, and P bonded to S1/S2 and C1/C2, where the atom also is bonded to at least one other moiety to satisfy the valence of the atom;

(c) ferrocenyl;

(d) azulenyl; and (e) at least one aromatic heterocyclic ring as described herein.

The other moiety or moieties to satisfy the valence of the atom selected as the electron donor moiety (D1 through D6) may be for instance a hydrogen atom, or a hydrocarbon group such as the following:

(a) a straight alkyl chain having for example 1 to about 20 carbon atoms, particularly 1 to about 12 carbon atoms, such as pentyl, decyl and dodecyl;

(b) a branched alkyl group having for example 3 to about 40 carbon atoms, particularly 3 to about 30 carbon atoms such as isopropyl, isopentyl and 2-propyl-pentyl;

(c) a cycloalkyl group having for example 3 to about 30 carbon atoms, particularly 4 to 7 carbon atoms in the cycle, such as cyclopentyl and cyclohexyl; and (d) an aryl group, an arylalkyl group or alkylaryl group having for example 7 to about 30 carbon atoms such as p-methyl-benzyl, 3-(p-ethyl-phenyl)-propyl and 5-(1-naphthyl)-pentyl.

The conjugated bridging moiety (C1 through C6) may be any suitable group through which electrons can pass from the electron donor moiety (D1 through D6) to the electron acceptor moiety (A1 through A6). In embodiments, the conjugated bridging moiety (C1 through C6) is a π-electron conjugated bridge that is composed of for example (there is no overlap among the categories (a), (b), and (c) described below):

(a) at least one aromatic ring such as one, two or more aromatic rings having for instance from about 6 carbon atoms to about 40 carbon atoms such as —$C_6H_4$—, and —$C_6H_4$—$C_6H_4$—;
(b) at least one aromatic ring such as one, two or more aromatic rings conjugated through one or more ethenyl or ethynyl bonds having for instance from about 8 carbon atoms to about 50 carbon atoms such as —$C_6H_4$—CH=CH—$C_6H_4$—, and —$C_6H_4$—C≡C—$C_6H_4$—; and
(c) fused aromatic rings having for instance from about 10 to about 50 carbon atoms such as 1,4-$C_{10}H_6$ and 1,5-$C_{10}H_6$.

The liquid crystal compatibilizing moiety (S1 through S6) may be any suitable group that increases miscibility of the liquid crystal domain stabilizing compound with the liquid crystal. The liquid crystal compatibilizing moiety (S1 through S6) can be 1, 2, 3, or more groups, where each group may be the same or different from each other. The liquid crystal compatibilizing moiety (S1 through S6) may be for example the following:

(a) a substituted or unsubstituted hydrocarbon having for example 1 to about 30 carbon atoms.
(b) a heterocyclic moiety having for example from 5 to about 15 atoms (referring to number of carbon atoms and heteroatom(s), where the heteroatom can be for instance N, O, S, P, and Se. Exemplary examples include: piperidine, ethyl-piperidine, methylpirrolidine.
(c) a hetero-acyclic moiety having for example from 5 to about 15 atoms (referring to number of carbon atoms and heteroatom(s), where the heteroatom can be for instance N, O, S, P, and Se. Exemplary examples include: glycol and polyglycol ethers, alcohol moieties like for example 2-hydroxy-ethyl, and thiol moieties like for example ethyl-2-methyl-ethyl-thioether.

When the liquid crystal compatibilizing moiety (S1 through S6) is a hydrocarbon, the hydrocarbon may be for example the following:

(a) a straight chain alkyl group having for example 2 to about 30 carbon atoms, particularly 2 to about 12 carbon atoms, such as pentyl, decyl and dodecyl.
(b) a branched alkyl group having for example 3 to about 40 carbon atoms, particularly 3 to about 30 carbon atoms such as isopropyl, isopentyl and 2-propyl-pentyl.
(c) at least one cycloalkyl group such as one, two or more bonded cycloalkyl groups having for example 3 to about 8 carbon atoms, particularly 4 to 7 carbon atoms in the cycle, such as cyclopentyl and cyclohexyl. Optionally, one or more hydrogen atoms of the cycloalkyl group may be replaced with for example an alkyl group having for example 1 to about 20 carbon atoms, an arylalkyl group having for example 3 to about 30 carbon atoms, a cycloalkyl group having for example 3 to about 8 carbon atoms, particularly 4 to 7 carbon atoms in the cycle, or an alkylcycloalkyl group having for example 4 to about 30 carbons.
(d) an arylalkyl group or alkylaryl group having for example 7 to about 30 carbon atoms such as p-methyl-benzyl, 3-(p-ethyl-phenyl)-propyl and 5-(1-naphthyl)-pentyl.

In embodiments, the liquid crystal compatibilizing moiety (S1 through S6) may be a hydrocarbon optionally substituted with for example a liquid crystal moiety, a heterocyclic moiety optionally substituted with for example a liquid crystal moiety, or a hetero-acylic moiety optionally substituted with for example a liquid crystal moiety. The liquid crystal moiety may be composed of for example: (i) a flexible portion -hard core moiety composed of a flexible moiety such as an alkyl chain containing from about 4 to about 10 carbon atoms connected to a hard core comprised of a cyan (CN) group connected to a biphenyl or terphenyl, where the flexible portion—hard core moiety includes a connecting moiety; or (ii) a cholesteryl group including a connecting moiety.

To create the connecting moiety in the liquid crystal moiety, an atom (e.g, hydrogen) may be removed from a compound described herein as a liquid crystal; the removed atom is replaced with a connecting moiety which is either an atom (like for example O, N, S, or P) or a group (like for example —O—C(O)—, —C(O)—, —O—$(CH_2)_n$—O—) having at least two available valences and which is capable of bonding the liquid crystal moiety to the rest of the liquid crystal compatibilizing moiety (S1 through S6). For example, in compound 1-V, a hydrogen atom from a liquid crystal compound $CH_3$—$(CH_2)_4$—$C_6H_4$—$C_6H_4$—CN was replaced with an O atom, resulting in liquid crystal moiety, to allow bonding with the liquid crystal domain stabilizing compound through —$CH_2$ group. The whole group is assigned as S1. The term "liquid crystal moiety" is used even if the removal of atom or atoms from a compound described herein as a liquid crystal results in a liquid crystal moiety which does not possess a liquid crystal nature.

The polymerizable moieties Z2, Z4 and Z6 may be any monomers that can be polymerized to form an oligomer/polymer. Suitable monomers include those having a double bond (—CH=$CH_2$) or triple bond capable of being polymerized such as acryl or ethenyl. One or more hydrogen atoms in the monomer may be optionally replaced with for example the following: (a) alkyl chains having from 1 to about 10 carbon atoms; (b) substituted alkyl chains such as alkoxy, halide substituted alkyl groups (halides like F, Cl, Br, and I), and amino-alkyl groups where the alkyl moiety has from 1 to about 10 carbon atoms. Exemplary examples of polymerizable moieties are $H_2C$=CH—C(O)—O-(acryl), $H_2C$=C($CH_3$)—C(O)—O-(methacryl), $H_2C$=C($C_2H_5$)—C(O)—O-(ethacryl), —CH=$CH_2$ (vinyl), and —C($CH_3$)=$CH_2$. The polymerizable moiety $Z_i$ (i=2, 4, 6) may be attached to $S_i$(i=2, 4, 6), $D_i$(i=2, 4, 6), $C_i$(i=2, 4, 6), $A_i$(i=2, 4, 6) or R6.

The values e', e" and e''' represent the degree of polymerization and are numbers ranging for example from 1 to about 100 or higher.

The values a', a", b', b", c', c" are integers such as for example from 1 to 3.

A first exemplary group of liquid crystal domain stabilizing compounds are encompassed by formula (1) and formula (2). In formula (2) the repetitive dipolar structural unit composed of S2, D2, C2, and A2 is similar to compounds represented by formula (1) except that one of the moieties of the dipolar structural unit is bound to Z2.

The electron acceptor moiety (A1,A2) may be any suitable atom or group capable of accepting electrons. In embodiments, the electron acceptor moiety (A1,A2) is an electron withdrawing functional moiety which according to Hammett equation possesses a positive Hammett constant (σp). The electron acceptor moiety (A1,A2) may be for example the following:

(a) an aldehyde (—CO—H);
(b) a ketone (—CO—R) where R may be for example a straight chain alkyl group having for example 1 to about 20 carbon atoms, particularly 1 to about 12 carbon atoms, such as methyl, ethyl, pentyl, decyl and dodecyl; a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl;
(c) an ester (—COOR) where R may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;
(d) a carboxylic acid (—COOH);
(e) cyano (CN);
(f) nitro ($NO_2$);
(g) nitroso (N=O);
(h) a sulfur-based group (e.g., —$SO_2$—$CH_3$; and —$SO_2$—$CF_3$);
(i) a fluorine atom;
(j) an alkene (—CH=$CR_2$ or —CH=CHR) where each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and
(k) a boron atom.

Exemplary examples of liquid crystal domain stabilizing compounds encompassed by formula (1) are shown below.

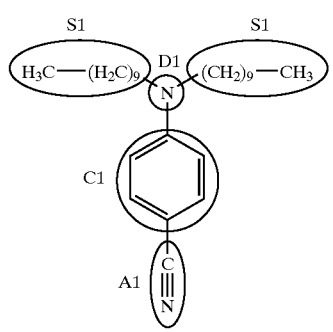

1-I

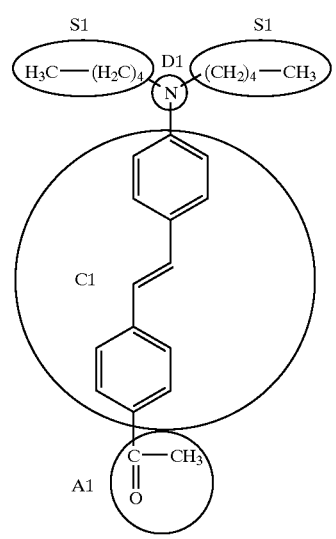

1-II

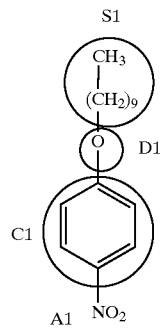

1-III

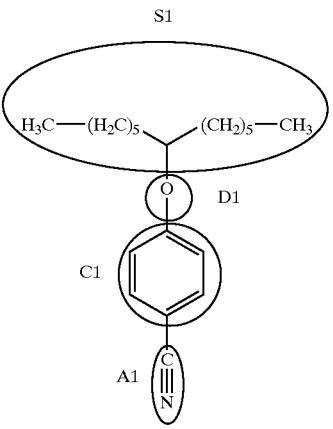

1-IV

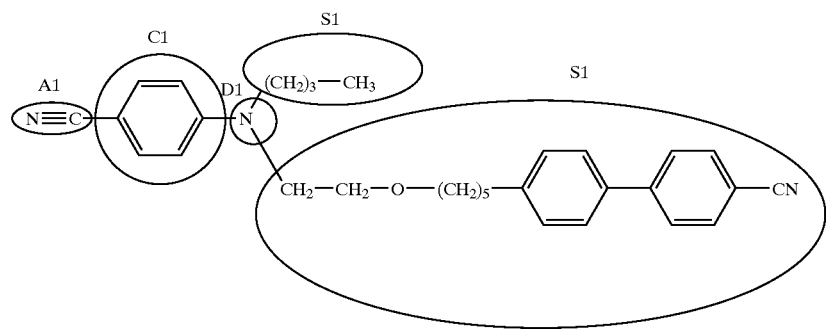

1-V

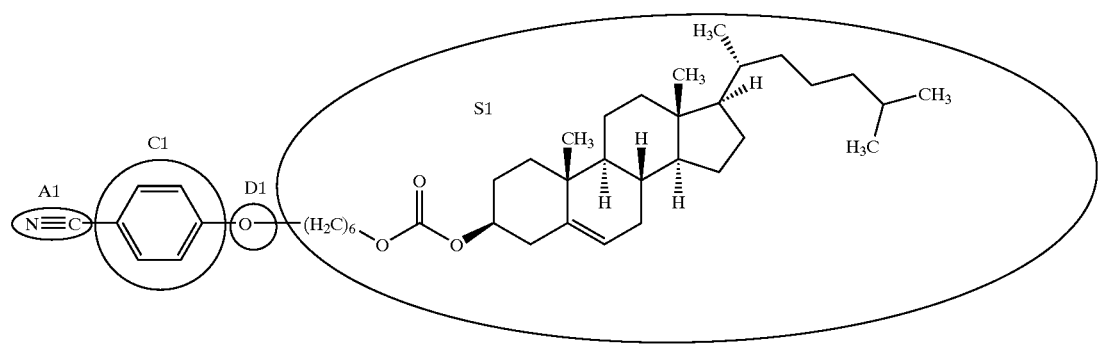

1-VI

Compounds of type 1-I and 1-II are prepared by palladium catalyzed coupling reaction of the bromo or iodo aromatic precursor with secondary amines. General synthetic procedures for this widely used coupling reaction are known (J. P. Wolfe et al., "Room temperature catalytic amination of aryl iodides", J. Org. Chem., 1997, 62, p. 6066; J. P. Wolfe et al., "Scope and limitations of the Pd/BINAP-catalyzed Admination of aryl bromides", J. Org. Chem., 2000, 65, p. 1144.; J. F. Hartwig, "Transition metal catalyzed synthesis of arylamines and aryl ethers from aryl halides and triflates: scope and mechanism." Angewandte Chemie, International Edition (1998), 37(15), p. 2046; Hartwig, John F. "Carbon-Heteroatom Bond-Forming Reductive Eliminations of Amines, Ethers, and Sulfides" Accounts of Chemical Research, 1998, 31(12), 852). The disclosures of the above recited documents are totally incorporated herein by reference. The reaction proceeds in the presence of a base like t-BuONa, and with a palladium based catalyst formed in situ from a soluble palladium precursor like tris(dibenzylidenacetone)dipalladium ($Pd_2DBA_3$) and a ligand like 1,1'-bis (diphenylphosphino)ferrocene(DPPF) or 2,2'-Bis(diphenylphosphino)1–1'-binaphtyl(BINAP).

Compounds of type 1-III and 1-IV are synthesized by coupling the phenoxyde anion precursor with a bromo-alkyl derivative. The anion is prepared by using a base like $K_2CO_3$ (general procedure is described for example in Organic Syntheses, Coll. Vol 3, p. 140, the disclosure of which is totally incorporated herein by reference).

Compounds 1-V and 1-VI illustrate the embodiments where the liquid crystal compatibilizing moiety (S1, S2) contains a liquid crystal moiety. Compound 1-V is synthesized by coupling the alcohol precursor with a bromo-derivative containing the liquid crystal moiety (4-alkyl-cyano-biphenyl) in the presence of a base. Compound 1-VI is synthesized by reacting the alcohol precursor with cholesterylchloroformate in presence of an organic base like triethylamine.

In embodiments of the present invention, there is excluded from the compounds of formula (1) an excluded compound defined by a' is 2, A1 is cyano, C1 is phenyl, D1 is nitrogen, and each S1 is the same alkyl group. In embodiments, one, two or more of the following occur: a' is other than 2; A1 is other than cyano; C1 is other than phenyl, D1 is other than nitrogen, and one or both S1 is other than a straight chain alkyl group.

Examples of macromolecular compounds of formula (2) are shown below. In compound 2-I, the polymerizable group Z2 is vinyl; in compound 2-II the polymerizable group is an acrylic function; and in compound 2-III, the polymerizable group is a methacrylic function. In these cases, the polymerizable group is bonded to the liquid crystal compatibilizing group. Compound 2-IV is an example where the polymerizable group Z2 is bonded to the electron acceptor moiety.

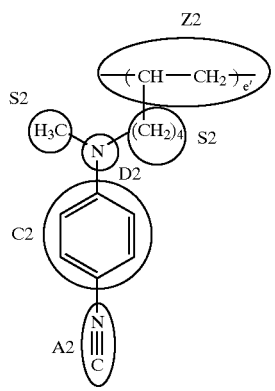

2-I

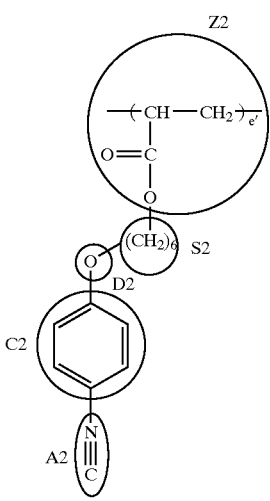

2-II

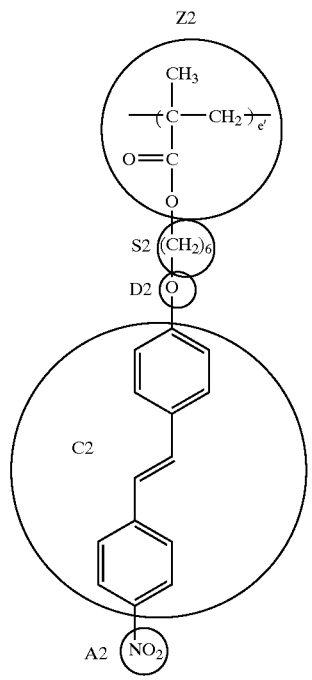

2-III

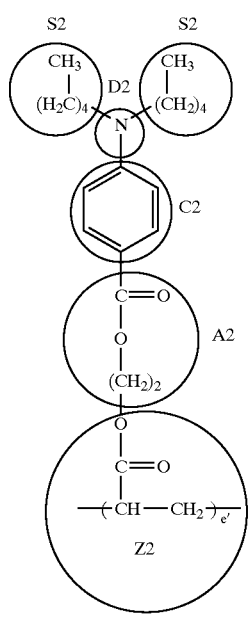

2-IV

The dipolar structural unit (composed of S2, D2, C2, and A2) is synthesized by palladium catalyzed coupling reaction as already described for compounds of formula (1). S2 is synthesized by reacting the phenoxide anion with bromoalkyl alcohols (Br—(CH$_2$)$_n$—OH for compounds 2-II through 2-IV). The monomers (Z2 bonded to dipolar structural unit composed of S2, D2, C2, and A2) are polymerized by reacting the previous alcohol derivative with acryloyl chloride (2-II and 2-IV) or methacryloyl chloride (compound 2-III). General procedures are known as described in G. Iftime et al. "Synthesis and Characterization of Two Chiral Azobenzene-Containing Copolymers" Macromolecules, 2002, 35(2), 365, the disclosure of which is totally incorporated herein by reference. The polymerization may be done in situ, by using thermal or photochemical initiation.

A second exemplary group of liquid crystal domain stabilizing compounds is encompassed by formula (3) and (4). In compounds of formula (3) and (4) the liquid crystal compatibilizing moieties (S3, S4) are bonded to the electron acceptor moieties (A3 and A4, respectively). In formula (4) the repetitive dipolar structural unit composed of S4, D4, C4, and A4 is similar to compounds represented by formula (3) except that one of the moieties of the dipolar structural unit is bound to Z4.

The electron acceptor moiety (A3, A4) may be any suitable atom or group capable of accepting electrons and which possess a valence capable of forming a bond with the liquid crystal compatibilizing moiety (S3,S4). In embodiments, the electron acceptor moiety (A3, A4) is an electron withdrawing functional moiety which according to Hammett equation possesses a positive Hammett constant ($\sigma p$). The electron acceptor moiety (A3, A4) may be for example the following:

(a) a carbonyl group (—CO—);
(b) a carboxyl group (—COO—);
(c) a sulphone (—$SO_2$—);
(d) an alkene (—CH═C(R)—) where R may be for a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methylbenzyl, 3-(p-ethyl-phenyl)-propyl and 5-(1-naphthyl)-pentyl; and
(e) an imine group (—C═N—).

Examples of compounds corresponding to formula (3) are shown below:

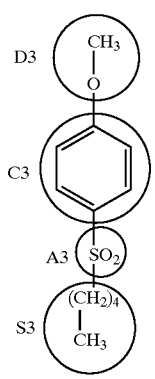

3-I

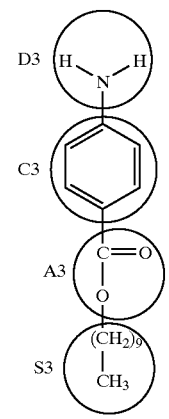

3-II

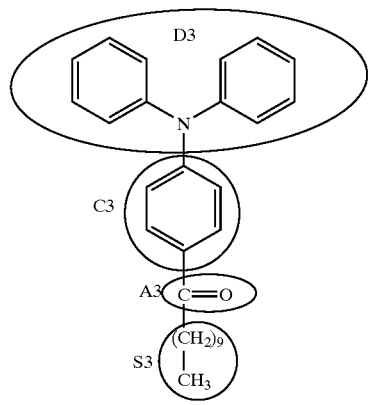

3-III

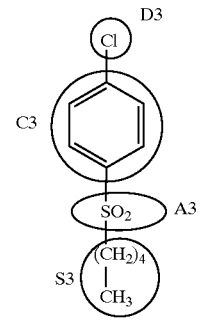

3-IV

Sulphone group (—$SO_2$—) in compounds 3-I and 3-IV is generated by oxidation of the corresponding sulfide (—S—) for example with hydrogen peroxide (general procedure described in Z.-S. Hu et al., "Novel polyesters with aminosulfone azobenzene chromophores in the main chain", J. Polym. Sci., Part A: Polymer Chemistry, 2000, 38, p. 2245, the disclosure of which is totally incorporated herein by reference). Alkyl ester groups are synthesized by one of the many known procedures of esterification. A preferred mild procedure is 1,3-dicyclohehylcarbodiimide (DCC) coupling of the carboxylic acid function with the corresponding alcohols, generally in dichloromethane as a solvent (general procedure is described for example in J. Am. Chem. Soc., 1986, 108, p. 3112, the disclosure of which is totally incorporated herein by reference).

Examples of macromolecular compounds corresponding to formula (4) are shown below.

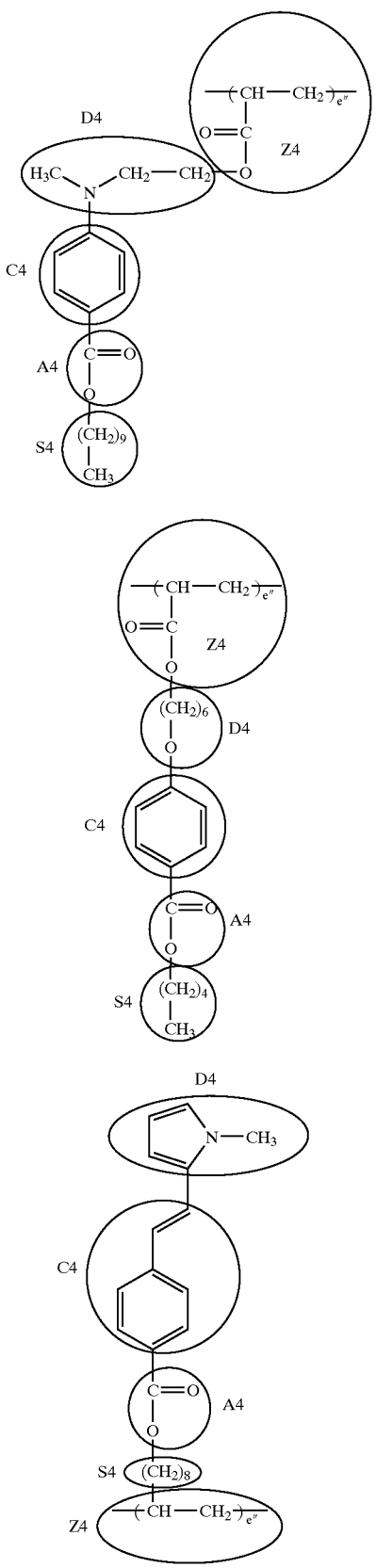

Monomers corresponding to the polymeric structures of formula (4) may be synthesized by 1,3-dicyclohehylcarbodiimide (DCC) coupling of the carboxylic acid function of the benzoic acid precursors with the corresponding alcohols, generally in dichloromethane as a solvent (general procedure is described for example in J. Am. Chem. Soc., 1986, 108, p. 3112, the disclosure of which is totally incorporated herein by reference). The polymerization may be done in situ, by using thermal or photochemical initiation.

A third exemplary group of liquid crystal domain stabilizing compounds is encompassed by formulas (5) and (6). In embodiments of compounds of formula (5) and (6), the liquid crystal compatibilizing moiety (S5, S6) is bonded to the conjugated bridging moiety (C5,C6), through a "direct bond" (i.e., the spacer moiety (R5, R6) is absent) or through an optional spacer moiety (R5, R6).

In formula (6), the repetitive dipolar structural unit composed of S6, R6, D6, C6, and A6 is similar to compounds represented by formula (5) except that one of the moieties of the dipolar structural unit is bound to Z6. A5 and A6 are electron acceptor moieties identical to A1 and A2. In addition, D5 and D6 are electron donor moieties identical to D3 and D4.

The electron acceptor moiety (A5,A6) may be any suitable atom or group capable of accepting electrons. In embodiments, the electron acceptor moiety (A5,A6) is an electron withdrawing functional moiety which according to Hammett equation possesses a positive Hammett constant ($\sigma p$). The electron acceptor moiety (A5,A6) may be for example the following:

(a) an aldehyde (—CO—H);
(b) a ketone (—CO—R) where R may be for example a straight chain alkyl group having for example 1 to about 20 carbon atoms, particularly 1 to about 12 carbon atoms, such as methyl, ethyl, pentyl, decyl and dodecyl; a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl; an arylalkyl group or alkylaryl group having for example 7 to about 30 carbon atoms such as p-methyl-benzyl, 3-(p-ethyl-phenyl)-propyl and 5-(1-naphthyl)-pentyl;
(c) an ester (—COOR) where R may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;
(d) a carboxylic acid (—COOH);
(e) cyano (CN);
(f) nitro ($NO_2$);
(g) nitroso (N=O);
(h) a sulfur-based group (e.g., —$SO_2$—$CH_3$; and —$SO_2$—$CF_3$);
(i) a fluorine atom;
(j) an alkene (—CH=$CR_2$ or —CH=CHR) where each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl; and (k) a boron atom.

The spacer moiety (R5, R6) may be any atom or group having at least two available valences and which is capable of forming bonds with both the conjugated bridging moiety (C5,C6) on one side and with the liquid crystal compatibilizing moiety (S5, S6) on the other side, and which may be for example the following:

(a) a direct bond (that is, the spacer moiety (R5, R6) is absent);
(b) an oxygen atom;
(c) a sulfur containing moiety such as a sulfur atom or a sulfur group like —SO—, —SO$_2$—;
(d) a glycol ether unit having a formula —(O—CH$_2$—CH$_2$)$_n$—O— where n is an integer from 1 to about 5.
(e) a nitrogen containing moiety which is a nitrogen atom or of type —N(R)—, where R may be for example a hydrogen, a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl.

Examples of compounds corresponding to formula (5) are shown below:

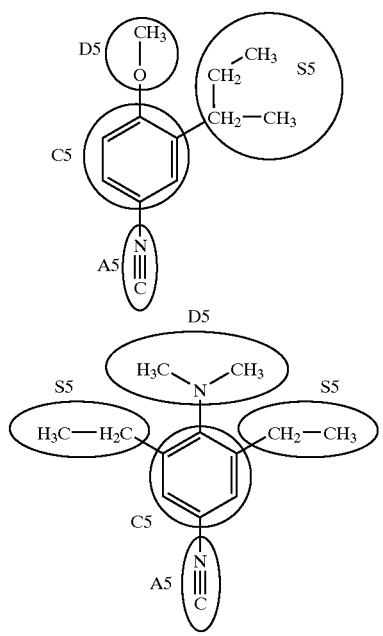

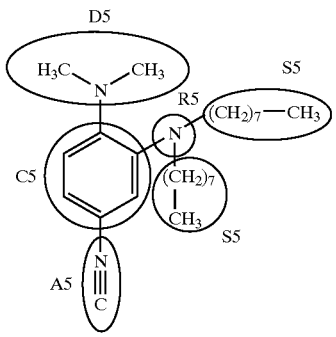

5-III

For synthesis of compounds of formulas (5) and (6), amino functional groups are introduced to the aromatic ring by palladium catalyzed coupling reaction between the bromo or iodo precursor with corresponding amine containing at least one N—H bond using procedures similar to that described in J. F. Hartwig, "Transition metal catalyzed synthesis of arylamines and aryl ethers from aryl halides and triflates: scope and mechanism," Angewandte Chemie, International Edition (1998), 37(15), p. 2046; and Hartwig, John F. "Carbon-Heteroatom Bond-Forming Reductive Eliminations of Amines, Ethers, and Sulfides," Accounts of Chemical Research, 1998, 31(12), 852, the disclosures of which are totally incorporated herein by reference. Friedel-Crafts alkylation allows insertion of alkyl groups to the aromatic ring (textbook: Olah, George A. "Friedel-Crafts Chemistry", 1973, the disclosure of which is totally incorporated herein by reference). For synthesis of compounds of formula (6), polymerization is being initiated thermally or photochemically.

Examples of compounds represented by formula (6) are shown below.

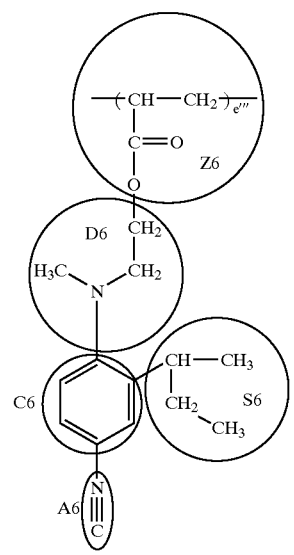

6-I

-continued

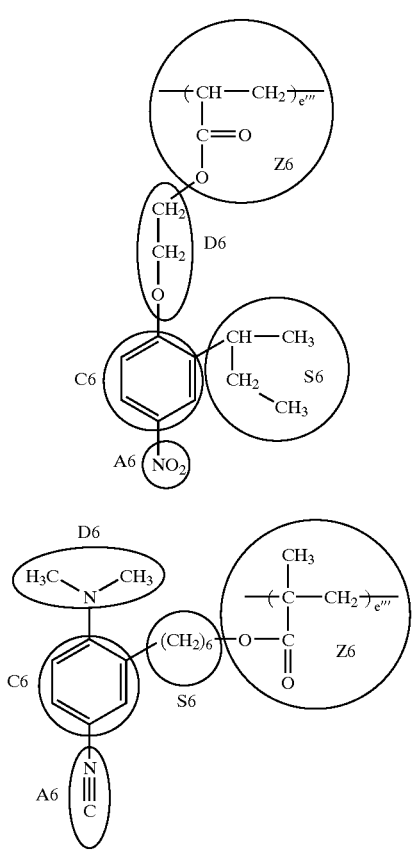

There may be situations in the description of compounds of formulas (1) through (6) where a moiety can be seen as having two functions. This may create some difficulties in assigning the type of moieties for the examples shown in the structures. However, when assigning these functions we take into account the primary function only. For example, in the case of compound 5-III, the —N(CH$_3$)$_2$ was assigned as D5, but the other N atom could be viewed as having an electron donor function as well. However, the main role of the other N atom is to allow bonding of two S5 groups, and thus it was assigned as R5. In addition, the other N atom is placed in a meta-position with respect to the electron acceptor moiety A5, so that conjugation with A5 is minimal, when compared with conjugation of D5 with A5 (para-position allows for strong electron transfer through the conjugated bridging moiety from D5 to A5).

In embodiments, the liquid crystal composition can include a single liquid crystal domain stabilizing compound. In other embodiments, the liquid crystal composition can include two, three, or more different liquid crystal domain stabilizing compounds. In embodiments, there may be present a combination of a macromolecule liquid crystal domain stabilizing compound and a small molecule liquid crystal domain stabilizing compound. The different liquid crystal domain stabilizing compounds may be present in the liquid crystal composition in any suitable equal or unequal ratio ranging for example from about 10% (first liquid crystal domain stabilizing compound):about 90% by weight (second liquid crystal domain stabilizing compound) to about 90% (first liquid crystal domain stabilizing compound):about 10% by weight (second liquid crystal domain stabilizing compound).

The liquid crystal composition is prepared for example by mixing a liquid crystal of a selected helical pitch with the liquid crystal domain stabilizing compound along with one or more other optional ingredients (e.g., a dispersant and a non-dipolar co-monomer) as described herein. The liquid crystal composition may be homogenized by shaking and/or stirring.

The liquid crystal domain stabilizing compound has a solubility in the liquid crystal ranging for example from about 0.1% to 100% by weight at room temperature (about 25 degrees C.). An elevated temperature ranging from about 40 to about 130 degrees C. may be used to facilitate dissolution of the liquid crystal domain stabilizing compound in the liquid crystal. Insoluble amounts of the liquid crystal domain stabilizing compound may be optionally removed by filtration.

In embodiments, an initiator or initiators may be used to facilitate synthesis of a "macromolecule" liquid crystal domain stabilizing compound. The initiator may be any suitable compound that facilitates polymerization of the monomers used in forming the oligomer/polymer. In embodiments, the polymerization is done in situ, by using thermal or photochemical initiation. In the case of thermal initiation classical initiators can be used and they are known to those skilled in the art. Examples of thermal initiators include for example 2,2'-azobisisobutyronitrile (AIBN) or benzoyl peroxide. Polymerization is carried at temperatures between about 30 to about 100 degrees C., depending on the desired initiation rate and on the thermal initiator used in the process. A thermal initiator may be added in an amount from about 0.01% to about 10%, or from about 0.1% to about 1%, with respect to the total amount of the liquid crystal composition.

Photochemical initiation may be done by using visible light initiation. This option may be preferable to the classical UV initiation because in embodiments the monomers may absorb too much in the UV range, slowing down or stopping the polymerization. Visible light initiators include for example camphoroquinone or H-Nu 470. They initiate the polymerization when subjected to 470 nm wavelength light. The photochemical initiator may be added in an amount of about 0.01% to about 3%, or from about 0.1% to about 1%, with respect to the total amount of liquid crystal composition. When photochemical initiation is performed, the liquid crystal composition contains also the amount of initiator. To prevent premature polymerization, while preparing the liquid crystal composition, in these embodiments, the mixture is heated for only short periods of time for example about 1 to about 5 minutes at a lower temperature ranging for example from about 30 to about 50 degrees C.

A dispersant or a mixture of two or more different dispersants may be optionally included in the liquid crystal composition. The dispersant(s) may be present in an amount ranging from about 0.1% to about 20% by weight, or from about 1% to about 10% by weight, based on the weight of the liquid crystal composition. Where two or more different dispersants are used, the different dispersants may be present in the liquid crystal composition in any suitable equal or unequal ratio ranging for example from about 10% (first dispersant):about 90% by weight (second dispersant) to about 90% (first dispersant):about 10% by weight (second dispersant). In embodiments, the dispersant may be added to those liquid crystal compositions containing a "small molecule" liquid crystal domain stabilizing compound. In other embodiments, the dispersant may be added to those liquid crystal compositions containing a "macromolecule" liquid crystal domain stabilizing compound. The dispersant may be any suitable compound that being present at the boundaries of liquid crystal domains acts as a barrier to association of neighboring liquid crystal domains, preventing their growth and re-alignment after the voltage is turned off. In embodiments, the addition of a dispersant results in longer term stability of the white state (described herein) and in improved uniformity of the white state. The dispersant in embodiments is typically miscible with the liquid crystal composition.

Dispersants are for instance non-aqueous surfactants which are typically used for dispersing particles in high resistivity media. Dispersants useful for this invention are for example neutral non-ionic molecules or oligomers containing hydrophilic and hydrophobic groups.

For compatibility with the liquid crystal composition, dispersants may possess relatively large alkyl chains, containing for example from about 5 to about 50 carbon atoms, or from about 8 to about 30 carbon atom chains. The alkyl chains can be straight or may optionally be branched or may contain one or more aromatic rings, to increase compatibility with the liquid crystal composition. Dispersants include, but are not limited to the following:

(a) polyoxylethylene glycol and derivatives thereof with a molecular weight from about 100 to about 3,000. Derivatives can be hydroxy-terminated polyoxylethylene glycols; polyoxyethylene alkyl ethers with an alkyl group containing from about 1 to about 30 carbon atoms, which can be for example lauryl, cetyl, stearyl, oleyl; polyoxyethylene esters of fatty acids where the fatty acid contains from about 1 to about 30 carbon atoms, like for example oleic acid, lauric acid, and stearic acid.

(b) alkanolamides resulted from condensation of fatty acids with alkanolamines, having from 8 to about 60 carbon atoms.

(c) aminoxydes of general structure $R_1R_2R_3NO$ where the $R_1$, $R_2$ and $R_3$ groups are independently selected and contain from about 1 to about 30 carbon atoms.

(d) sorbitan esters resulting from condensation of sorbitol with a carboxylic acid ester containing from about 2 carbon atoms to about 60 carbon atoms. Sorbitan esters useful for this invention are for example sorbitan monolaurate, sorbitan monostearate, sorbitan monopalmitate, sorbitan trioleate, and sorbitan tristearate.

(e) glycerol and polyglycerol mono-and poly-esters where the ester groups contain from about 2 to about 30 carbon atoms, like for example stearate, oleate, decyl, and octyl.

(f) polydimethylsiloxane polymers with a molecular weight from about 100 to about 3,000, terminated with a hydroxy group or with an alkyl, hydroxyalkyl or hydride group containing from about 0 to about 30 carbon atoms.

(g) alkyl alcohols of a general formula R—OH where R may be for a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl;

(h) non-ionic halogen containing surfactants, particularly fluorinated surfactants, possessing for example a perhalogenated hydrocarbon group. The halogen can be F, Cl, Br, or I. The non-ionic halogen-containing surfactants suitable for the present invention disclosed here can be made of for example:

(h)(1) two different structural units, the first one having a perhalogenocarbon chain of the general structure, $C_nX_m$— (C is carbon; X is a halogen such as F, Cl, Br, or I), where the chain may be straight, branched or may be a perhalogenated arylalkyl chain, where n is an integer from about 1 to about 200 and m is an integer from about 3 to about 600; and the second structural unit which does not contain $C_nX_m$— units. The second structural unit may be hydrophobic when it is made of hydrocarbon chains or silicone groups, where the hydrocarbon chains can be a straight or branched alkyl, alkylaryl, arylalkyl or cycloalkyl chain containing from about 1 to about 200 carbon atoms. The second structural unit can be hydrophilic when containing a water compatible non-ionic structure. The hydrophilic structure may be for example a poly-oxyethylated alcohol, a poly-propyleneoxide, an alkyl, a polyhydric alcohol, and an ethanethiol derivative.

(h)(2) a single structural unit containing both a hydrophobic perhalogenocarbon chain and a hydrophilic group. Exemplary examples are fluorinated polyethers like for example poly-tetrafluoro-ethylene and poly-hexafluoro-propeneoxide.

(i) pentaerythritol ethers, esters with alcohols or carboxylic acids having from about 1 to about 30 carbon atoms and alkoxylate ethers of pentaerythritol where alkoxylate can be ethoxylate or propoxylate.

(j) sucrose esters and ethers with a carboxylic acid or an alcohol having from about 1 to about 30 carbon atoms. Optionally more than one sucrose hydroxyl groups may be reacted with the alcohol or with the carboxylic acid.

(k) block copolymers of two or more monomers having a molecular weight from about 100 to about 5,000. Block copolymers may be for example polyethyleneglycol-co-polyethylene, polyethyleneglycol-co-polypropylene glycol, polyvinylalcohol-co-ethylene and polydimethylsiloxane-co-polyethyleneglycol.

Exemplary dispersants are shown in the figure below.

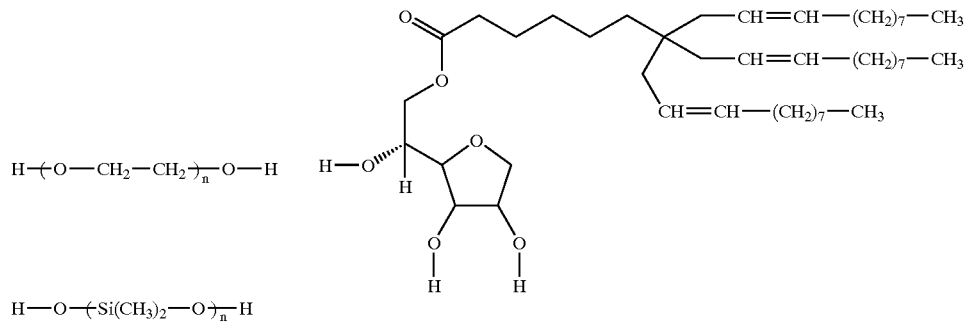

H—(O—CH$_2$—CH$_2$)$_n$—O—H

H—O—(Si(CH$_3$)$_2$—O)$_n$—H where n is an integer ranging for example from 1 to about 200.

The monomers of the "macromolecule" liquid crystal domain stabilizing compounds (e.g., compounds of formulas (2), (4), and (6)) are referred herein as dipolar monomers. To illustrate the structure of the dipolar monomers, the dipolar monomer in the compound of formula (2) corresponds to S2, D2, C2, A2, and Z2 where e' is 1.

One, two or more different types of dipolar monomers may be used in the synthesis of each "macromolecule" liquid crystal domain stabilizing compound. In embodiments, the dipolar monomer(s) may be polymerized together with an optional non-dipolar monomer (one, two, or more different types of the non-dipolar monomer) in the synthesis of each "macromolecule" liquid crystal domain stabilizing compound. The dipolar monomer(s) and the optional non-dipolar monomer(s) may be used in any suitable equal or unequal ratio (by weight or by moles). The non-dipolar monomer may be referred herein as a non-dipolar co-monomer. The term "co-monomer" includes embodiments where there is one, two, or more different types of non-dipolar monomers used with one, two or more different types of dipolar monomers.

The non-dipolar monomer contains neither an electron donor moiety nor an electron acceptor moiety, in contrast to the exemplary liquid crystal domain stabilizing compounds of formulas (1) through (6) which contain an electron donor moiety and an electron acceptor moiety. The non-dipolar monomer may be any suitable compound that improves solubility of the dipolar monomer and initiator into the liquid crystal composition. The non-dipolar monomer may be in a liquid state and contains one or more polymerizable functional groups. It is added in an amount from about 10% to about 300% by weight with respect to the amount of dipolar monomer, or from about 10% to about 50% by weight. In embodiments one, two or more non-dipolar monomers may be used. When more than one non-dipolar monomer is being used, the relative amount of each non-dipolar monomer may be from about 5% to about 95% by weight with respect the total amount of non-dipolar monomers. During the device fabrication process, the dipolar monomer(s) and non-dipolar monomer(s) are polymerized together inside the liquid crystal containment structure in the presence of the liquid crystal, initiator and optional dispersant. Due to the presence of the non-dipolar monomer(s), the structure of the macromolecular liquid crystal domain stabilizing compound incorporates the structural units of the non-dipolar monomer(s). In embodiments, the resulting liquid crystal domain stabilizing compounds are random copolymers (2, 3 or more monomers) containing dipolar structural units and non-dipolar structural units. In embodiments, the addition of the non-dipolar monomer may result in an improved uniformity of the transparent state. In embodiments without the added non-dipolar monomer, depending on the mixing time and temperature, the transparent state may exhibit a few slightly white spots, which may be the result of a non-homogeneous initial mixture due to some limited miscibility of some of the materials into the liquid crystal composition. These slightly white spots may disappear because of homogenization induced by the presence of the non-dipolar monomer.

The non-dipolar monomer may be monomers containing one or more (up to 6) polymerizable functional groups, bonded to a core. A generic formula is shown below for the non-dipolar monomer where n represent the number of polymerizable groups and is a number from 1 to about 6. The polymerizable group may be an acrylate, methacrylate, or ethacrylate polymerizable functional group.

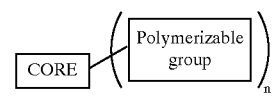

The monomer core may be:
(a) mono- or poly-radical (up to 6 radicals) of a hydrocarbon having for example 1 to about 60 carbon atoms, where the hydrocarbon may be for example a straight chain alkyl group having for example 1 to about 60 carbon atoms, particularly 1 to about 20 carbon atoms, such as 1-pentyl, 1,2-pentyl, 1,3-pentyl, 1,5,10-decyl and 1,4,8,12-dodecyl; a branched alkyl group having for example 3 to about 50 carbon atoms, particularly 3 to about 30 carbon atoms such as isopropyl, isopentyl and 2-propyl-pentyl; a cycloalkyl group having for example 3 to about 30 carbon atoms, particularly with 4 to 7 carbon atoms in the cycle, such as cyclopentyl and cyclohexyl; an arylalkyl group or an alkylaryl group having for example 7 to about 60 carbon atoms such as p-methyl-benzyl, 3-(p-ethyl-phenyl)-propyl and 5-(1-naphthyl)-pentyl; and a bisphenol radical. Exemplary non-dipolar monomers include nonyl methacrylate, lauril acrylate and diacrylate, 1,4-butanediol-diacrylate, 1,3-butylene glycol diacrylate, trimethylolpropane triacrylate and propoxylated neopentyl glycol diacrylate.

(b) glycol, polyoxylethylene glycols, alkoxylated glycols mono-and poly radicals with a molecular weight from about 100 to about 3,000. Exemplary non-dipolar monomers include ethoxylated lauryl acrylate, polyethylene glycol diacrylate, 2-(2-ethoxyethoxy) ethyl acrylate and ethoxylated nonyl phenol methacrylate, and phenoxyethyl methacrylate, propoxylated neopentyl glycol diacrylate.

(c) glycerol, alkoylated and polyalcoxylated glycerol ethers mono- and poly-radical derivatives with a molecular weight from about 100 to about 3,000, where alkoxylate can be ethoxylate or propoxylate. Exemplary non-dipolar monomers include glyceryl triacrylate, propoxylated glyceryl triacrylate.

(d) pentaerythritol, and alkoylated and polyalcoxylated ethers mono- and poly-radical derivatives thereof, with a molecular weight from about 100 to about 3,000, where alkoxylate can be ethoxylate or propoxylate. Exemplary non-dipolar monomers include dipentaerythritol pentaacrylate, and ethoxylated dipentaerythritol pentaacrylate.

(e) epoxy and modified epoxy. Exemplary non-dipolar monomers include epoxy acrylate monomers which may be modified with an amine like for example CN2100 (Sartomer product), with a fatty acids like for example CN2101 (Sartomer product), and with chlorine like for example CN 2201 (Sartomer product).

(f) radicals of alkoxylated and polyalcoxylated ethers incorporating heteroatom-containing hydrocarbon groups, with a molecular weight from about 100 to about 3,000. Exemplary non-dipolar monomers include tris-(2-hydroxy ethyl) isocyanurate triacrylate, alkoxylated tetrahydrofurfuryl acrylate.

(g) urethane and derivatives thereof with a molecular weight of about 100 to 3,000. Exemplary examples of non-dipolar monomers are for example CN-962 (urethane acrylate, Sartomer product), CN-1963 (urethane methacrylate, Sartomer product) and CN-963B80 (urethane acrylate blended with SR-238, Sartomer product).

In embodiments, using both the non-dipolar co-monomer and the dispersant may be desired.

Regarding the amounts of the various ingredients to employ in the present invention, the following illustrative proportions are provided:
(a) liquid crystal: about 80% to about 98% by weight based on the weight of the liquid crystal composition;
(b) liquid crystal domain stabilizing compound: about 2% to about 20% by weight based on the weight of the liquid crystal composition;
(c) initiator: about 0.2% to about 3% by weight based on the weight of the liquid crystal composition;
(d) dispersant: about 0.5% to about 5% by weight based on the weight of the liquid crystal composition;
(e) non-dipolar co-monomer: about 1% to about 3% by weight based on the weight of liquid crystal composition.

An illustrative example is as follows, where the percentages by weight are based on the weight of all ingredients in the liquid crystal composition:
(a) liquid crystal: 95%
(b) liquid crystal domain stabilizing compound: 3%
(c) initiator: 0.5%
(d) dispersant: 1%
(e) non-dipolar co-monomer: 0.5%.

The present liquid crystal composition is capable of forming a strongly scattering state of a first plurality of smaller liquid crystal domains that strongly scatters a predetermined light wavelength or wavelengths and a weakly scattering state of a second plurality of larger liquid crystal domains that weakly scatters the predetermined light wavelength or wavelengths.

The existence of liquid crystal domains will now be discussed. In both strongly and weakly scattering states, the helical axes of the liquid crystal are not all perfectly oriented parallel to one another. In fact, in embodiments, the helical axes of the liquid crystal may be more or less randomly oriented. Domain boundaries appear at the edges where orientation of helical axes changes. This polydomain state is known as a focal-conic state.

In embodiments, for both the strongly scattering state and the weakly scattering state, the liquid crystal domains contact one another (i.e., no void among them) and in the case of larger domains they have a lamellar shape. In the case of smaller domains, the difference between length and width is less significant. In a device where the volume occupied by the liquid crystal composition is typically fixed, the number of liquid crystal domains is inversely proportional with the domain size (i.e., domain number decreases with increased domain size if the domains contact one another with no voids between them). In embodiments, the smaller liquid crystal domains have a domain size range of for example from about 0.5 to about 10 micrometers, or any subset thereof such as from about 5 to about 10 micrometers. In embodiments, the larger liquid crystal domains have a domain size range as follows: (a) a length ranging for example from about 10 to about 40 micrometers, or any subset thereof such as from about 25 to about 30 micrometers; and (b) a width ranging for example from about 5 to about 20 micrometers, or any subset thereof such as from about 5 to about 10 micrometers.

The phrase "strongly scattering state" refers to transmission of 0% to about 20%, particularly, 0% to about 10% of the predetermined light wavelength or wavelengths and the phrase "weakly scattering state" refers to transmission of about 80% to 100%, particularly about 90% to 100% of the predetermined light wavelength or wavelengths. This definition implies that the back of the device is transparent when characterization by transmission spectroscopy is performed. In embodiments, values outside the light transmission ranges described herein are encompassed if there is sufficient difference in light scattering between the "strongly scattering state" and the "weakly scattering state" to enable the present device to function as for example a photonic device such as for instance a display device, an optical digital storage device, an optical switching device, or some other photonic device. The extent of light scattering depends upon a number of factors such as for example the predetermined light wavelength or wavelengths, the liquid crystal domain size, the particular liquid crystal, and the number of liquid crystal domains.

As noted herein, the phrases "weakly scattering state" and the "strongly scattering state" encompass a range of light transmission values. Consequently, for a particular liquid crystal and a predetermined light wavelength or wavelengths, there may be a single liquid crystal domain size range or a plurality of liquid crystal domain size ranges that yield the "weakly scattering state" and there may be a single liquid crystal domain size range or a plurality of liquid crystal domain size ranges that yield the "strongly scattering state." Thus, the "weakly scattering state" encompasses one or a plurality of liquid crystal domain states having the desired weakly light scattering attribute, where these various weakly scattering states may differ in the liquid crystal domain size range. Similarly, the "strongly scattering state" encompasses one or a plurality of liquid crystal domain states having the desired strongly light scattering attribute, where these various strongly scattering states may differ in the liquid crystal domain size range.

When the "weakly scattering state" and the "strongly scattering state" are described as being switchable between each other, this encompasses the following embodiments:

(a) where the "weakly scattering state" has generally the same liquid crystal domain size range every time there is a switch to the "weakly scattering state," and where the "strongly scattering state" has generally the same liquid crystal domain size range every time there is a switch to the "strongly scattering state" (this embodiment may be accomplished for example by not varying from the procedures used to produce each of the multiple "weakly scattering states" and by not varying from the procedures used to produce each of the multiple "strongly scattering states");

(b) where during repeated switching between the "strongly scattering state" and the "weakly scattering state," the liquid crystal domain size range of the multiple "weakly scattering states" may differ (this embodiment may be accomplished by using for example different electric field strengths among the multiple "weakly scattering states"); and (c) where during repeated switching between the "strongly scattering state" and the "weakly scattering state," the liquid crystal domain size range of the multiple "strongly scattering states" may differ (this embodiment may be accomplished by using for example different electric field strengths among the multiple "strongly scattering states").

The number of liquid crystal domains can be for example in the hundreds, thousands, tens of thousands, or millions with a range of domain sizes. In embodiments, a number of the liquid crystal domains such as for example about 70% to 100% of the liquid crystal domains may change in size when switching occurs. However, in embodiments, some of the liquid crystal domains will remain unchanged in size when switching occurs.

In embodiments where the device is a display device, the extent of light reflectance by the display device may be determined by reflectance spectrophotometry measured for instance for the whole visible spectrum (380 nm to 730 nm). Gretag spectrophotometer at normal angle with respect to the device surface may be used in order to measure the reflectance of the inventive devices, such light reflectance measurement procedures being well known to those skilled in the art.

The present device includes a liquid crystal containment structure defining a space for the liquid crystal composition. The space has a thickness ranging for example from about 5 micrometers to about 50 micrometers. In embodiments, the predetermined light enters the space (and the liquid crystal composition) at an orthogonal angle or any other appropriate angle.

The structure may be substantially transparent to the predetermined light to allow the predetermined light to reach the liquid crystal composition. The phrase "substantially transparent" when used to describe the structure encompasses one or more substantially transparent sections and/or one or more openings. In addition, the phrase "substantially transparent" when used to describe the structure refers to, in embodiments, the transmission of about 60% to 100% of the predetermined light that enters the structure; light transmission values outside this exemplary range are encompassed where such light transmission values enable the present device to function as for example a display device, an optical digital storage device, an optical switching device, or some other photonic device.

In embodiments, the device also includes a colored (that is, non-white) surface positioned to absorb a portion of the predetermined light that passes through the liquid crystal composition in the weakly scattering state where the liquid crystal composition may be disposed between substantially transparent sections of the structure and the colored surface. The extent of light absorption by the colored surface may be such that an observer sees the predetermined color (black, gray, red, green, or any other desired color) when looking through the substantially transparent sections of the structure and the liquid crystal composition at the colored surface. The colored surface may be for example a painted layer or a separate colored layer. The colored surface (whether a painted layer or a separate colored layer) needs to be thick enough so that it is not transparent to the incident light, i.e., a viewer does not see anything through a device after painting or placing the colored layer. A separate colored layer may be for example fabricated from colored glass, colored paper or colored plastic. The colored layer may be attached to or held in place to the structure via for example an adhesive or a clamp.

In embodiments, the structure is substantially transparent to the predetermined light to allow entry of the predetermined light into the structure, through the liquid crystal composition, and exit of the predetermined light from the structure in the weakly scattering state.

In embodiments, the liquid crystal containment structure is composed of two flat sections that are sealed around their edges and separated by spacers to define the space for the liquid crystal composition. The sections may be transparent, fabricated from for example glass or plastic materials. The internal sides of the transparent sections are coated with a conductive electrode layer, which constitute the electrodes required to apply different electric fields in order to switch the device to different states. The conductive electrode layers are substantially transparent. Typical materials for transparent electrodes include indium-tin oxide and the like, where the transparent electrodes have a resistivity of for example less than or equal to about 125 ohm/sq. Spacers used to control the thickness of the space for the liquid crystal composition may be glass fibers or polymeric fibers or spheres. Fabrication of the liquid crystal containment structure may be accomplished by first dispensing glue on the edges of one of the sections, placing the second section on top, followed by curing to harden the glue. The glue can be either UV photo-curable like for example Norland Optical Adhesives or thermo-curable like for example epoxy glues. A small opening is left unsealed, which is used for vacuum filling of the liquid crystal composition. Complete sealing of the filled liquid crystal containment structure can be accomplished with a thermally curable epoxy glue. In the case of a device containing monomers for a "macromolecule" liquid crystal domain stabilizing compound, polymerization of such monomers to obtain the "macromolecule" liquid crystal domain stabilizing compound is obtained by exposure to light or by heating (in the case of thermal initiation).

Sealing not only provides structural stability to the liquid crystal containment structure but also may prevent air leakage into the containment structure except at the opening and this enables air-filling.

Where the present device is used for example as a white and black display, an observer sees white as the color produced by device in the strongly scattering state where the predetermined light is in the visible spectrum.

As used herein, "white state" and "black state" refer to the perceived color of the reflected ambient light from the strongly scattering state composed of the smaller liquid crystal domains (for the "white state") and from the weakly scattering state composed of the larger liquid crystal domains (for the "black state" where the colored surface in the device is black).

As used herein, the "transparent state" refers to weakly scattering state composed of the larger liquid crystal domains which is referred as "black state" when the colored surface is black.

In embodiments, the device may optionally include one or more mirrors and/or one or more fiber optic wires (external to the device or incorporated into the device) to facilitate the transmission of the predetermined light within the device.

A light source (external to the present device or incorporated into the device) may generate the predetermined light. Any suitable light wavelength or wavelengths may be employed such as those wavelengths useful for a display device, an optical digital storage device, an optical switching device, or some other photonic device. The suitable wavelength or wavelengths may be in any part of the spectrum such as the visible spectrum ranging for example from about 380 nm to about 730 nm, and the infrared spectrum ranging for example from about 730 nm to about 2000 nm, particularly from about 800 nm to about 1700 nm. The light source may be for example a laser, a light bulb, or sunlight. In the context of an optical switching device, the "predetermined light" refers to the wavelength(s) of the light which is turned ON or turned OFF by the optical switch device. When the device is used as a display, the "predetermined light" is ambient visible light.

An electric field generating apparatus (external to the present device or incorporated into the device) produces the desired electric fields. The electric field generating apparatus may be a single device or two or more devices that can produce the desired electric fields. The electric field generating apparatus can produce an electric field ranging for example from 0 V/$\mu$m to about 10 V/$\mu$m, particularly from about 1 V/$\mu$m to about 10 V/$\mu$m, a voltage ranging from 0 V to about 250 V, particularly from about 20 V to about 120 V.

To change either the initial state (i.e., prior to the application of any electric field to the liquid crystal composition) or the weakly scattering state to the strongly scattering state, the electric field generating apparatus produces for instance a first electric field of sufficient strength to form an unstable state of a single liquid crystal domain (that is, no separate liquid crystal domains are visually observed). The first electric field can be a value ranging for example from about 2 V/$\mu$m to about 10 V/$\mu$m, particularly from about 3 V/$\mu$m to about 7 V/$\mu$m. The first electric field is applied for a time ranging for example from about 1 msec to about 1 sec, particularly from about 10 msec to about 100 msec. The first electric field is then reduced to a strongly scattering state inducing level to yield the strongly scattering state. The liquid crystal domains spontaneously arrange into the strongly scattering state at the strongly scattering state inducing level. The strongly scattering state inducing level corresponds to an electric field ranging for example from 0% to about 30% of the first electric field, particularly from 0 to about 10% of the first electric field. For instance, the strongly scattering state inducing level corresponds to an electric field ranging from 0% to about 5% of the first electric field, particularly 0%. The strongly scattering state inducing level is applied for a time ranging for example from about 10 msec to about 1 sec, particularly from about 10 msec to about 100 msec.

To change either the initial state (i.e., prior to the application of any electric field to the liquid crystal composition) or the strongly scattering state to the weakly scattering state, the electric field generating apparatus produces for instance a second electric field weaker than the first electric field but stronger than the strongly scattering state inducing level. The second electric field is greater than the strongly scattering state inducing level by a value ranging for example from about 30% to about 70%, particularly from about 40% to about 60% of the difference between the first electric field and the strongly scattering state inducing level. For instance, the second electric field may be from about 0.5 V/$\mu$m to about 4 V/$\mu$m, particularly from about 0.75 V/$\mu$m to about 3 V/$\mu$m. The second electric field is applied for a time ranging for example from about 10 msec to about 1 sec, particularly from about 20 msec to about 200 msec.

In embodiments, the switching between the weakly scattering state and the strongly scattering state may be accomplished without any significant degradation of the device for any desired number of times such as for example hundreds, thousands, millions of times or higher.

In embodiments, in the initial state just after device fabrication but before application of any electric field, the liquid crystal composition may be mostly in a planar state, i.e., helices aligned perpendicularly to the surfaces of the liquid crystal confinement structure used to define the space for the liquid crystal composition. A few focal-conic domains of large size coexist with the planar state (that is, the liquid crystal composition in the initial state may be considered a single liquid crystal domain with a few "imperfections"). This initial state is suitable for measuring the reflected wavelength of the liquid crystal helices, which is an indirect measurement of the helical pitch of the liquid crystal. This initial state may be used in order to optimize the helical pitch of the liquid crystal. In fact, in the initial state, the liquid crystal composition may be transparent to all wavelengths except to the wavelength corresponding to the helical pitch of the liquid crystal. In embodiments, after applying the first or the second electric field as described in this invention, the liquid crystal composition may never return to this initial state.

In embodiments, the strongly scattering state and/or the weakly scattering state may be stable. The term "stable" refers to the fact that each of these states is capable of maintaining its characteristics as strongly scattering or weakly scattering for a period of time after the applied electric field is turned off. The term "stable" also may be to describe a "white state" and a "black state" which refers to the fact that each of these states is capable of maintaining its color for a period of time after the applied electric field is turned off, where the perceived color (white/black) is of the reflected light from the strongly scattering state (for the white state) and from the weakly scattering state (for the black state where the colored surface in the device is black). Within the time frame for "stable," some "decay" may occur over time such as a change in the liquid crystal domain size range but such a change in embodiments should not change a strongly scattering state to a weakly scattering state or a weakly scattering state to a strongly scattering state. The length of time that the strongly scattering state and the weakly scattering state are "stable" depends on a number of factors such as the type of liquid crystal, the type and concentration of the liquid crystal domain stabilizing compound, and the like. In embodiments, the length of time that the strongly scattering state and the weakly scattering state are "stable" after the applied electric field is turned off is sufficient for the device to function as any type of photonic device such as a display device, an optical switching device, an optical digital storage device, and the like, such a "stable" time period lasting for example from at least about 10 seconds and up such as minutes, perhaps hours, days, or even longer, particularly from about 10 seconds to about 20 minutes. For example, for a display device, the term "stable" means a long enough time so that a document written by applying a number of electric fields can be read when the power is turned off. In other words, the display maintains the written image for a long enough time to be readable at zero voltage. For example, the image is stable for a minimum of about 10 seconds. Some little decay may occur within the specified time, but this does not affect significantly the image, which is still perfectly readable. In an optical switching device, the term "stable" means the strongly scattering state and the weakly scattering state are capable of persisting until the next generation of an electric field to perform the switching.

Bistability allows fabrication of low power consuming devices, which are suitable for design of integrated optics circuits. Still, another important use of bistable devices is in optical digital storage, since after writing, the information is stable and can be read with a probe beam.

The term "unstable" when referring to the unstable state of the single liquid crystal domain produced by the first electric field means that this state immediately changes when the applied electric field is turned off or when the applied electric field is significantly lowered, for example, by at least about 50%. Immediately means less than about 0.5 seconds. In other words, this state is lost so fast so that an observer may not detect it after the applied electric field is turned off. In embodiments of the present invention, this unstable state produced by the first electric field may have the following characteristics: (a) a single liquid crystal domain (with no "imperfections"); (b) a homotropic state having an ordered structure with no liquid crystal helices; (c) liquid crystal molecules are perpendicular to the surfaces defining the space for the liquid crystal composition; and (d) transparent to all light wavelengths.

FIGS. 1–4 depict an embodiment of the present device useful as a display device 2A, particularly for example a white and black display. The device is composed of a liquid crystal containment structure 4A. The liquid crystal containment structure is composed of a top transparent flat section 8A and a bottom transparent flat section 10A wherein the two flat sections are sealed around their edges and are separated by spacers (not shown) to define a space 6A for the liquid crystal composition. The internal side of the top section is coated with a transparent conductive electrode layer 28A and the internal side of the bottom section is coated with a transparent conductive electrode layer 30A to provide the electrodes needed to apply the electric field for switching. The external side of bottom section includes a colored surface 12. The liquid crystal composition 14A is disposed in the space. An electric field generating apparatus 16A is coupled to the two electrode layers.

Figure 2:
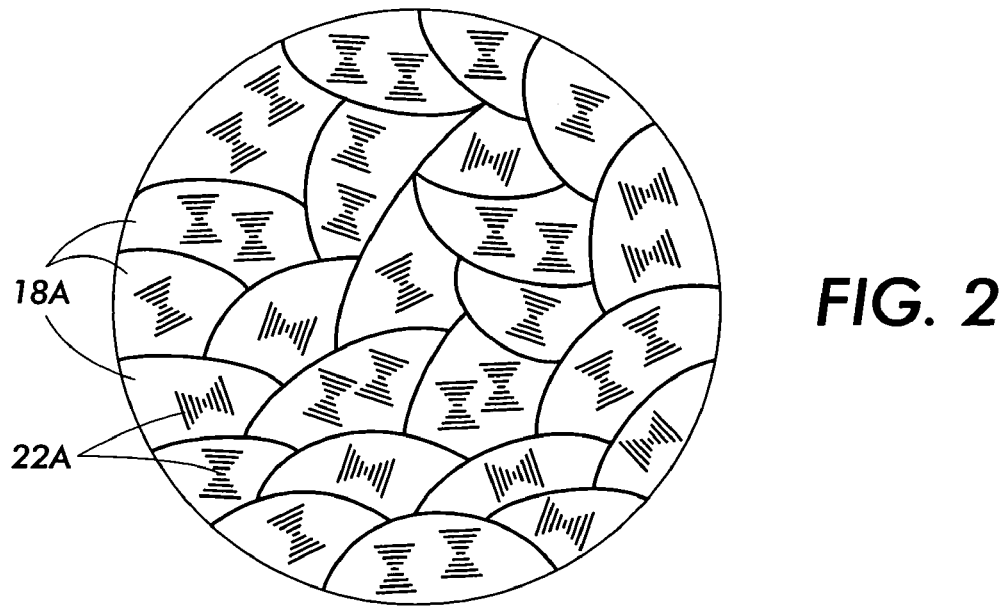
FIG. 2 depicts a simplified magnified view of a portion of the device of FIG. 1.

FIGS. 1–2 illustrate the strongly scattering state where the predetermined light 24A is scattered by the plurality of smaller liquid crystal domains 18A. To an observer looking in the direction of the colored surface 12, the colored surface appears white (where the predetermined light is in the visible spectrum). FIG. 2 depicts a magnified view of the liquid crystal composition in the strongly scattering state of a plurality of smaller liquid crystal domains 18A, where the smaller domains are in a random orientation. The orientation of the smaller liquid crystal domains is the orientation of the helices 22A inside the domains.

Figure 3:
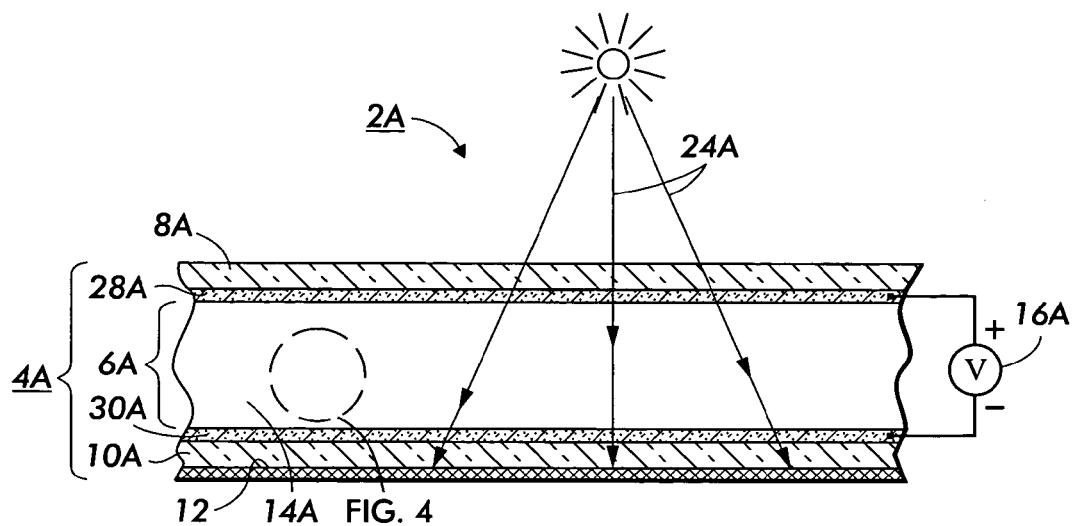
FIG. 3 depicts an elevational simplified view of the first embodiment of the present device where the device exhibits a weakly scattering state.
Figure 4:
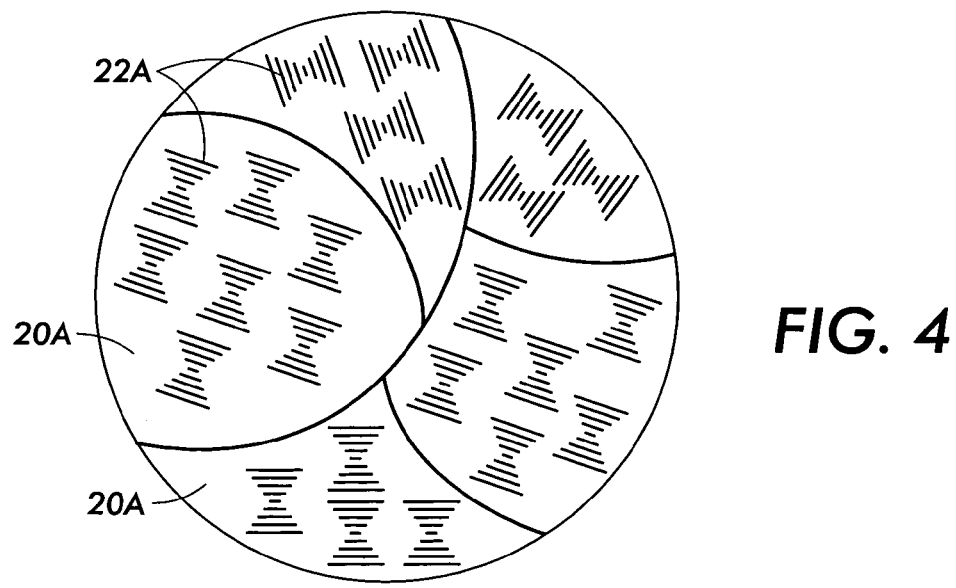
FIG. 4 depicts a simplified magnified view of a portion of the device of FIG. 3.

FIGS. 3–4 illustrate the weakly scattering state of a plurality of larger liquid crystal domains where the predetermined light 24A passes through the structure 4A to the colored surface 12 where the predetermined light is weakly scattered by the plurality of the larger liquid crystal domains 20A. The colored surface 12 absorbs a portion of the predetermined light. To an observer looking in the direction of the colored surface, the colored surface has the color of the colored surface (where the predetermined light is in the visible spectrum). FIG. 4 depicts a magnified view of the liquid crystal composition in the weakly scattering state of a plurality of larger liquid crystal domains 20A where the larger domains are in a random orientation. The orientation of the larger liquid crystal domains is the orientation of the helices 22A inside the domains.

FIGS. 5–8 depict an embodiment of the present device useful as an optical switching device 2B between two optical fibers (not shown) where a light signal can be transmitted or not from one optical fiber to the next optical fiber in a controlled manner. The device is composed of a liquid crystal containment structure 4B. The liquid crystal containment structure is composed of a top transparent flat section 8B and a bottom transparent flat section 10B wherein the two flat sections are sealed around their edges and are separated by spacers (not shown) to define a space 6B for the liquid crystal composition. The internal side of the top section is coated with a transparent conductive electrode layer 28B and the internal side of the bottom section is coated with a transparent conductive electrode layer 30B to provide the electrodes needed to apply the electric field for switching. The liquid crystal composition 14B is disposed in the space. An electric field generating apparatus 16B is coupled to the two electrode layers. The device 2B includes a receiver 26 to receive any predetermined light that passes through the structure 4B. The receiver 26 may be separate from or coupled to structure 4B. The receiver may for example amplify the light signal, act as a switch or act as a transducer converting the light signal into another signal type (e.g., sound, electrical impulse, mechanical and the like). The receiver 26 is commercially available from a number of vendors.

Figure 5:
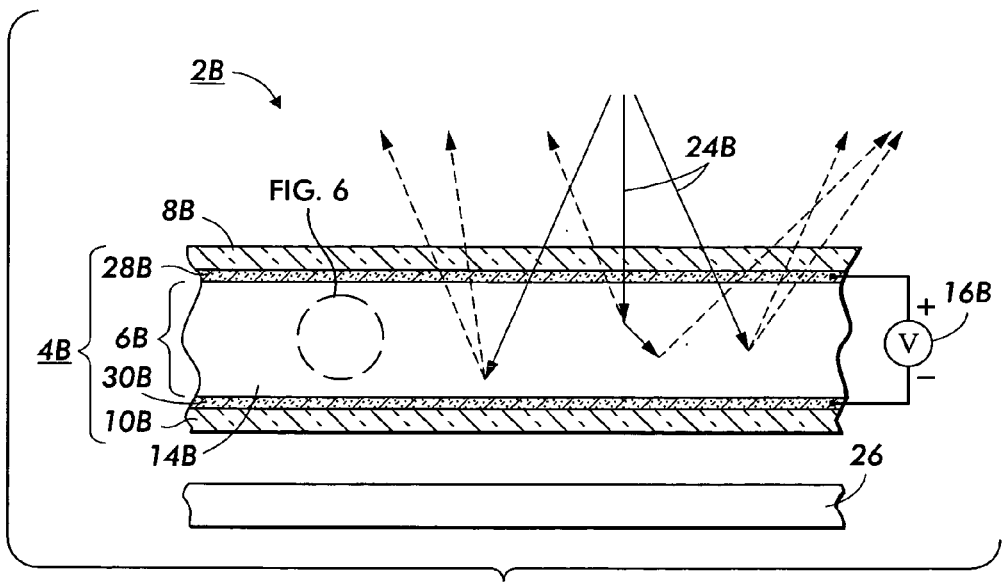
FIG. 5 depicts an elevational simplified view of a second embodiment of the present device where the device exhibits a strongly scattering state.
Figure 6:
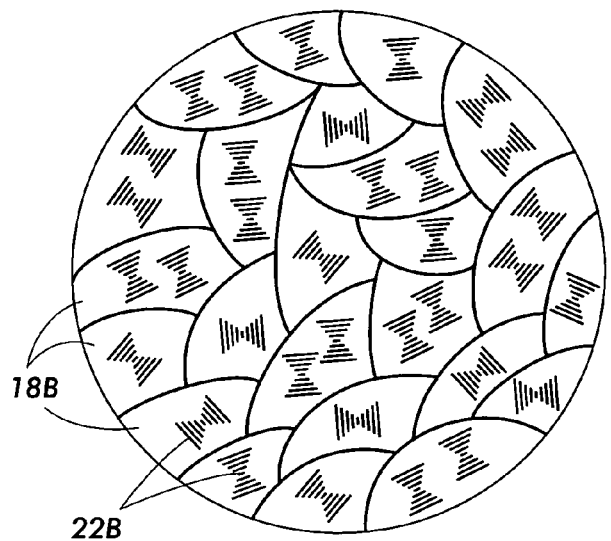
FIG. 6 depicts a simplified magnified view of a portion of the device of FIG. 5.

FIGS. 5–6 illustrate the strongly scattering state where the predetermined light 24B is scattered by the plurality of smaller liquid crystal domains and little if any of the predetermined light reaches the receiver 26. FIG. 6 depicts a magnified view of the liquid crystal composition in the strongly scattering state of a plurality of smaller liquid crystal domains 18B. The orientation of the smaller liquid crystal domains is the orientation of the helices 22B inside the domains.

Figure 7:
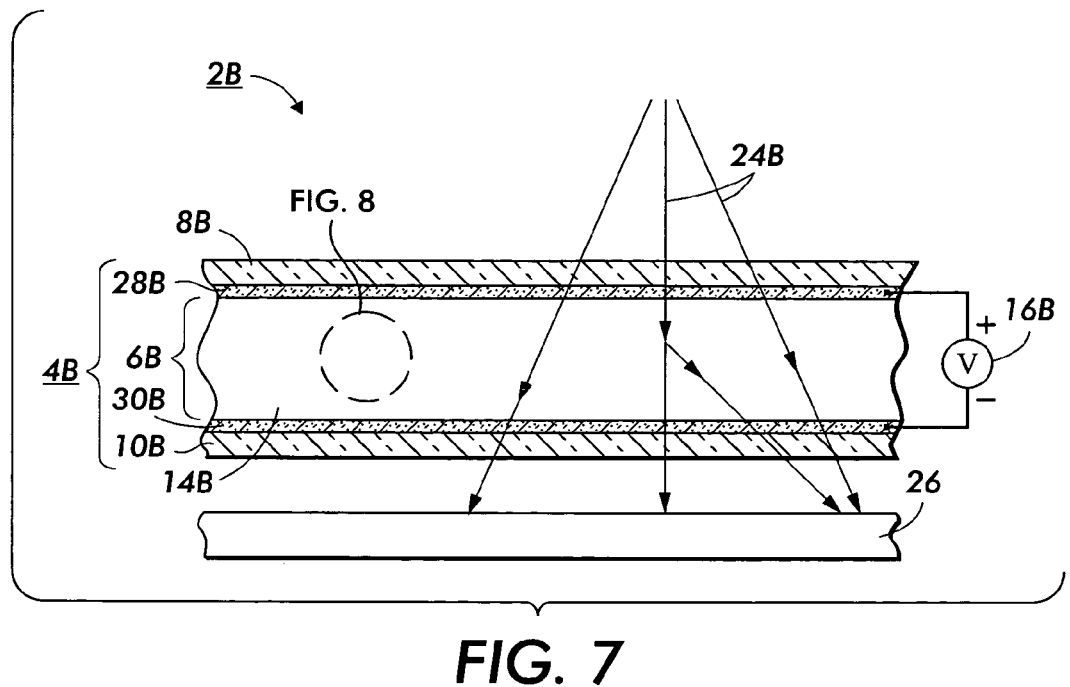
FIG. 7 depicts an elevational simplified view of the second embodiment of the present device where the device exhibits a weakly scattering state.
Figure 8:
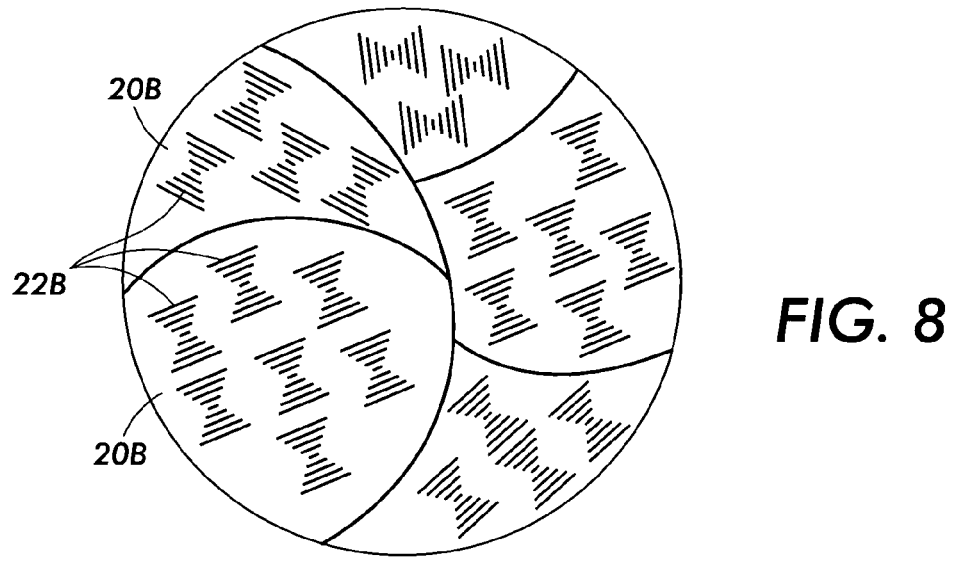
FIG. 8 depicts a simplified magnified view of a portion of the device of FIG. 7.

FIGS. 7–8 illustrate the weakly scattering state where the predetermined light 24B passes through the structure 4B to the receiver 26 (the predetermined light is weakly scattered by the plurality of the larger liquid crystal domains). FIG. 8 depicts a magnified view of the liquid crystal composition in the weakly scattering state of a plurality of larger liquid crystal domains 20B. The orientation of the larger liquid crystal domains is the orientation of the helices 22B inside the domains.

The invention will now be described in detail with respect to specific exemplary embodiments thereof, it being understood that these examples are intended to be illustrative only and the invention is not intended to be limited to the materials, conditions, or process parameters recited herein.

In the examples below, the following guidelines are followed unless otherwise noted:

(1) All percentages and parts are by weight.
(2) The switching in the devices between the weakly scattering state and the strongly scattering state is accomplished at room temperature, i.e., about 25 degrees C.
(3) All the liquid crystal containment structures were prepared and filled in the same manner as described in Example 7.
(4) Cholesteric liquid crystals sold under the "BL" series designation such as BL118 and BL087 are available from EM Industries, Inc.
(5) "Paper examples" describing illustrative work not actually performed are written in the present tense (examples 3, 4, 5 and 6), whereas actual experimental examples are written in the past tense.

EXAMPLE 1

Preparation of Liquid Crystal Domain Stabilizing Compound 1-I

About 0.23 g of tris(dibenzylidenacetone)dipalladium ($Pd_2DBA_3 \cdot CHCl_3$) and about 0.25 g of 1,1'-bis(diphenylphosphino)ferrocene (DPPF) were dissolved under inert atmosphere in 100 ml of toluene (freshly distilled and degassed from sodium/benzophenone). The solution was stirred for 10 min at room temperature. About 2.0 g of 4-bromo benzonitrile was added as solid to this mixture and the solution was stirred for about 15 min. About 1.48 g of solid t-BuONa then 3.43 g of didecylamine were added to the previous mixture. The mixture was heated at 90–100° C. for at least 20 hours. After cooling down, the organic phase was diluted with diethylether, washed with water, dried over $MgSO_4$, and solvent were removed with a rotaevaporator. The crude product was purified by column chromatography on silicagel by using a mixture of hexane/diethyl ether as eluent and after sovents evaporation was obtained as a pale yellow low melting point solid. The product was pure as tested by 1H-NMR and 13C-NMR spectroscopy.

EXAMPLE 2

Preparation of Liquid Crystal Domain Stabilizing Compound 2-II a. Synthesis of 4-NC—$C_6H_4$—O—$(CH_2)_3$—OH. About 2.14 g of 4-cyanophenol and 2.67 g of anhydrous $K_2CO_3$ were dissolved under inert atmosphere in 50 ml of acetone (distilled from $K_2CO_3$). About 1.95 ml of 3-bromo-1-hexanol was added and the solution was refluxed for at least 20 hours. Solids were filtered off, the crude product was dissolved in methylene chloride, washed with aqueous solution of NaOH (10%), then washed with water. The organic phase was dried over $MgSO_4$, and the solvent was removed with a rotaevaporator. The pure product was obtained by flash chromatography on silicagel with ethyl acetate/hexane solvents.

b. Synthesis of the monomer 4-NC—$C_6H_4$—O—$(CH_2)_3$—O—(O)C—CH=$CH_2$. About 1.0 g of 4-NC—$C_6H_4$—O—$(CH_2)_3$—OH was dissolved in 15 ml of tetrahydrofuran (THF) (distilled from sodium/benzophenone) and 3 ml of triethylamine. The solution was cooled at 0° C., then a solution containing about 0.67 ml of acryloyl chloride in 10 ml of THF was added drop-by-drop for a period of at least 30 min, under inert atmosphere. The solution was allowed to warm at room temperature and stirred for at least 24 hours. The solids were filtered off, the solvents were removed with an rotaevaporator. Pure monomer was obtained by recrystallization (ethanol/water) or by flash chromatography on silicagel.

c. The actual polymeric structure was obtained from this monomer, in situ, by illumination of the cell with visible light after the liquid crystal composition containing the monomer and initiator was prepared, and is explained in Example 9.

EXAMPLE 3

Preparation of Liquid Crystal Domain Stabilizing Compound 3-II

4-$O_2$N—$C_6H_4$—OOC—$(CH_2)_9$—$CH_3$ is synthesized by coupling of 4-nitrophenol with 1-decanol in presence of 1,3-dicyclohehylcarbodiimide (DCC), using a standard procedure (J. Am. Chem. Soc., 1986, 108, p. 3112, the disclosure of which is totally incorporated herein by reference). About 5.3 g of 4-$O_2$N—$C_6H_4$—OOC—$(CH_2)_9$—$CH_3$, 0.90 g of cobalt sulfide (CoSx) paste containing 0.055 g of Co., and 30 ml of ethyl acetate are placed into a reactor. The mixture is hydrogenated at 110° C. until the theoretical amount of hydrogen was consumed (about 2 hours). After depressurizing, the reaction mixture is filtered to recover the catalyst, solvent is removed on a rotary evaporator. The product is purified by recrystallization.

EXAMPLE 4

Preparation of Liquid Crystal Domain Sabilizing Compound 4-II a. HOOC—$C_6H_4$—O—$(CH_2)_6$—OH. A mixture of 19.4 g of 4-hydroxybenzoic acid and 21 g of KOH in a mixture of 20 ml of water and 45 ml of ethanol is heated at 80° C. with stirring. To this solution is added a solution of 35 ml of 6-chloro-hexanol dissolved in 10 ml ethanol, dropwise in about one hour. The mixture is refluxed while stirring for at least 20 hours. The solution is concentrated and washed with diethyl ether. The aqueous phase is acidified with 60 ml of concentrated HCl solution in water. The large amount of precipitate is filtered and dried, then the pure product is obtained by recrystallization from hot ethanol.

b. $CH_2$=CH—COO—$(CH_2)_6$—O—$C_6H_4$—COOH. About 5.0 g of HOOC—$C_6H_4$—O—$(CH_2)_6$—OH is dissolved under inert atmosphere in 60 ml of distilled THF and 8 ml of distilled triethylamine. The solution is cooled at 0° C., then a solution of 1.7 ml of acryloyl chloride in 10 ml of THF is added drop-by-drop. The mixture is allowed to stir at room temperature for at least 24 hours. The solids are filtered off, the solvents are removed with an rotary evaporator. Crude product is purified by recrystallization (ethanol/water) or by flash chromatography on silicagel.

c. $CH_2$=CH—COO—$(CH_2)_6$—O—$C_6H_4$—COO—$(CH_2)_4$—$CH_3$. About 2 g of $CH_2$=CH—COO—$(CH_2)_6$—O—$C_6$H4—COOH with 0.70 g of n-propanol and 0.090 g of 4-dimethylaminopyridine DMAP are dissolved in 25 ml of methylene chloride. About 7.5 ml of 1M solution of 1,3-dicyclohehylcarbodiimide DCC in methylene chloride are being added and the solution is stirred for at least 15 hours. The precipitate is removed by filtration, the organic phase is washed with water, solvent are removed on a rotary evaporator. The crude product is purified by column chromatography on silicagel with ethyl acetate/hexane mixture of solvents.

d. The actual polymeric structure is obtained from this monomer, in situ, by illumination of the cell with visible light after the liquid crystal composition containing the monomer and initiator is prepared using procedures similar to that described in Example 9.

EXAMPLE 5

Preparation of Liquid Crystal Domain Stabilizing Compounds 5-I and 5-II

Compound 5-I is synthesized by Friedel-Crafts alkylation of 4-methoxy-benzonitrile with butanol in presence of $AlCl_3$ as a catalyst. General experimental procedure is described in J. Am. Chem. Soc., 60, 1938, p. 1421, the disclosure of which is totally incorporated herein by reference.

Compound 5-II is synthesized by reacting [4-Br-(2,5-diethyl)-phenyl]-N,N-dimethyl aniline with CuCN/NaCN in dimethylformamide (DMF) (Dyes and Pigments, 47(1–2), pp.117–127; 2000, the disclosure of which is totally incorporated herein by reference).

EXAMPLE 6

Preparation of Liquid Crystal Domain Stabilizing Compound 6-II a. $O_2N—C_6H_4—O—CH_2CH_2—OH$ is synthesized by refluxing 2.3 g of 4-nitro-phenol with 1.8 ml of 2-bromo-ethanol in presence of 2.5 g of $K_2CO_3$ in acetone. Solids are filtered off, the crude product is dissolved in methylene chloride, wash with aqueous solution of NaOH (10%), then wash with water. The organic phase is dried over $MgSO_4$, and the solvent is removed with a rotary evaporator. The pure product is obtained by flash chromatography on silicagel with ethyl acetate/hexane solvents.

b. $O_2N—C_6H_4—O—CH_2CH_2—OOC—CH=CH_2$ is obtained by reacting 2.0 g of $O_2N—C_6H_4—O—CH_2CH_2—OH$ with 0.7 ml of acryloyl chloride in THF for at least 24 hours. Crude product is purified by recrystallization (ethanol/water) or by flash chromatography on silicagel.

c. $O_2N—C_6H_4—O—CH_2CH_2—OOC—CH=CH_2$ is coupled by Friedel-Crafts alkylation butanol in presence of $AlCl_3$ as a catalyst. General experimental procedure is described in J. Am. Chem. Soc., 60, 1938, p. 1421, the disclosure of which is totally incoporated herein by reference. Purification is done by column chromatography. The actual polymeric structure is obtained from this monomer, in situ, by illumination of the cell with visible light after the liquid crystal composition containing the monomer and initiator is prepared using procedures similar to that described in Example 9.

EXAMPLE 7

Preparation of a Device Containing Small Molecule Liquid Crystal Stabilizing Compound (1-I)

There was prepared a liquid crystal composition that included the following: 300 mg of BL118 (cholesteric liquid crystal reflecting at about 580 nm); 200 mg of BL087 (nematic liquid crystal, used to adjust the helical pitch); and 50 mg 4-NC—$C_6H_4$—N(n-$C_{10}H_{21}$)$_2$ (small molecule liquid crystal stabilizing compound).

The liquid crystal composition was homogenized by heating at about 210° C. and by shaking, then allowed to cool down to room temperature. An empty 25 micrometer thick liquid crystal containment structure was fabricated by sealing two indium tin oxide ("ITO") (transparent electrodes) glass coated slides. A small hole is kept in the sealing to be used for filling the liquid crystal composition. The containment structure was vacuum filled with the above liquid crystal composition, pressed and sealed. Immediately after preparation and before filling, the liquid crystal composition was in an essentially planar state (quasi-planar), which was used to measure the reflected wavelength of the prepared liquid crystal composition (which is an indirect measure of the helical pitch). The reflected wavelength was 960 nm. After the first switching, the liquid crystal composition never reached again the quasi-planar state, but was always in focal-conic states. The liquid crystal composition changed to a homeotropic state when a voltage of about 80 Vrms was applied (sine wave, 60 Hz). When the voltage was turned off, the liquid crystal composition went to the white state (focal-conic; small domains). When a voltage of 40–50 Vrms was applied, the liquid crystal composition switched to the transparent state (focal-conic; large domains).When the voltage was turned off, the liquid crystal composition maintained the transparent state. Reflectance measurements were performed with the device having a black background. White reflectance was 11% and black reflectance was 1.6%. Contrast ratio was 7/1. Both white and black states were stable for at least 4 says.

EXAMPLE 8

The procedures of Example 7 were followed except that the thickness for the space defined by the crystal containment structures was varied to determine the switching voltage needed to achieve the white state (the higher voltage) for a particular space thickness.

The results were as follows:

| Thickness (micrometers) | Switching Voltage (Vrms) |
|---|---|
| 25 | 82 V |
| 20 | 67 V |
| 15 | 54 V |
| 10 | 38 V |

EXAMPLE 9

Preparation of a Device Containing a Macromolecular Liquid Crystal Stabilizing Compound 2-II There was prepared a liquid crystal composition that included the following:
96.5% liquid crystal mixture (BL118/BL087=65/35);
3% $CH_2=CH—COO—(CH_2)_6—O—C_6H_4—CN$ (polymerizable monomer); and
0.5% camphoroquinone.

The liquid crystal composition was homogenized by light heating (to prevent polymerization initiation) and shaking. The composition was prepared under yellow light, again in order to prevent polymerization initiation. A 25 micrometer liquid crystal containment structure was prepared and filled with this composition using the procedures described in other examples, pressed and fully sealed. Then it was exposed to visible light (470 nm from a Xenon lamp, and by using appropriate optical band-pass filter) for at least 30 min. The device was placed over a black background tested for switching. It switched white when 100 V DC were applied then suddenly turned off the voltage. The white reflectivity was 19%. It switched transparent (black because of the black background) when 50–60 V DC was applied. It maintained the black state when the voltage was turned off. The contrast ratio was 7.5/1. The black state is stable (does not decay for at least 2 weeks). The white state maintained a good white reflectance for about 15 min. After this time, the device required refreshing in order to maintain a good white reflectance.

EXAMPLE 10

Preparation of a Device Containing a Dispersant

There was prepared a liquid crystal composition including the following:
95.5% liquid crystal mixture (BL181/BL087=60/40);
3% $CH_2$=CH—COO—$(CH_2)_6$—O—$C_6H_4$—CN (polymerizable monomer);
0.5% camphoroquinone; and
1% sorbitan trioleate (SPAN 85;dispersant, commercially available at Sigma-Aldrich).

A 25 micrometer liquid crystal containment structure containing the liquid crystal composition was prepared by shaking the liquid crystal composition and by slight heating (<60° C.) and filled with the liquid crystal composition using the procedures as described in other examples. The containment structure was exposed to 470 nm wavelength light for 1 hour. The device showed 17% white reflectivity, and a contrast ratio of 7/1. A high voltage of about 100 V DC was used. After turning off the high voltage, the liquid crystal composition was in the white state. A week after, the white reflectance was 14%. For comparison, a device made without dispersant as shown in EXAMPLE 9 had only 8% white reflectance a week after turning off the voltage.

EXAMPLE 11

Preparation of a Device Using a Non-Dipolar Co-Monomer

There was prepared a liquid crystal composition including the following:
96% liquid crystal mixture (BL118/BL087=60/40);
3% $CH_2$=CH—COO—$(CH_2)_6$—O—$C_6H_4$—CN (polymerizable monomer);
0.5% camphoroquinone; and
0.5% SR9003 (propoxylated neopentyl glycol diacrylate; non-dipolar co-monomer, commercially available).

The liquid crystal composition was homogenized as described in Example 9. Then a 25 micrometer liquid crystal containment structure was prepared and filled with the liquid crystal composition using the procedures described in other examples and exposed to visible light (470 nm) for 1 hour. The device switched homeotropic at 100 V DC, then white when the voltage was turned off. It switched transparent (black on a black background) when 50–60 V DC or AC was applied. Both white and states were stable immediately after turning off the voltage, but the white started to decay as described in Example 9. The transparent state was very uniform with no whitish spots. In contrast, some whitish spots were visible in the transparent state when a comparison device was prepared using the same procedures except that no co-monomer was used.

EXAMPLE 12

The same procedures of Example 11 were used except that the amount of the non-dipolar co-monomer was lower. A very uniform black state was obtained even when the amount of co-monomer was lower (for example 0.2% of the overall liquid crystal composition) and no damaging effect over the white state quality was observed.

EXAMPLE 13

Several devices containing the identical liquid crystal composition described below were prepared using the procedures of Example 11, where such devices differed in the thickness of the space defined by the liquid crystal containment structure. The liquid crystal composition included the following:
96% liquid crystal mixture (BL118/BL087=65/35);
3% CH=CH—COO—$(CH_2)_6$—O—$C_6H_4$—CN (polymerizable monomer);
0.5% camphoroquinone; and
0.5% SR9003 (non-dipolar co-monomer, commercially available).

The results are shown below (switching was done with DC voltage; measurements of reflectance were done with a black background):

| Thickness (micrometers) | Vwhite | Vblack | White reflectance |
|---|---|---|---|
| 25 | 102 V | 65 V | 19% |
| 20 | 82 V | 45 V | 17% |
| 15 | 63 V | 30 V | 13% |
| 10 | 42 V | 25 V | 10% |

EXAMPLE 14

Preparation of a Device Containing Both Dispersant and Non-Dipolar Co-Monomer

There was prepared a liquid crystal composition which included the following:
96% liquid crystal mixture (BL118/BL087=65/35);
3% CH=CH—COO—$(CH_2)_6$—O—$C_6H_4$—CN (polymerizable monomer);
0.5% camphoroquinone;
0.5% SR9003 (non-dipolar co-monomer, commercially available); and
1% SPAN 85 (dispersant).

The liquid crystal composition was homogenized as described in Example 9. A liquid crystal containment structure was prepared and filled with the liquid crystal composition using the procedures described in other examples. After sealing, the liquid crystal composition is exposed for 1 hour to 470 nm wavelength light. The device switches at about 100 V to achieve stable white state when the voltage is turned off. The device switches to a transparent state when a voltage of 50–70 V is applied. This state is uniformly transparent and stable after the voltage is turned off.

We claim:
1. A composition comprised of a liquid crystal and a compound having formula (4)

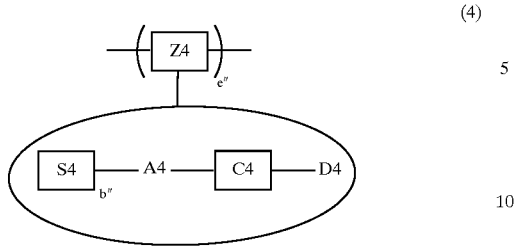

(4)

wherein:
D4 is an electron donor moiety which possesses a negative Hammett constant;
C4 is a conjugated bridging moiety which is one aromatic ring;
A4 is an electron acceptor moiety;
S4 is a liquid crystal compatibilizing moiety;
b" is an integer;
Z4 is a polymerizable moiety; and
e" is the degree of polymerization
wherein D4 is selected from the group consisting of:
(a) an atom selected from the group consisting of N, O, S, and P Where The valence of the atom is satisfied by bonding with C4 and optionally with Z4;
(b) an atom selected from the group consisting of N, O, S, and P bonded to C4, and optionally with Z4, where the atom also is bonded to at least one other moiety to satisfy the valence of the atom;
(c) ferrocenyl;
(d) azulenyl; and
(e) at least one aromatic heterocyclic ring
wherein the compound of formula (4) is selected from the group, consisting of 4-I and 4-II but excluding 4-III:

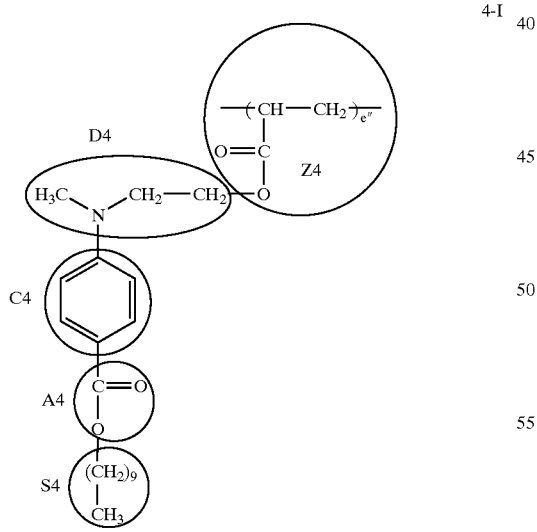

4-I

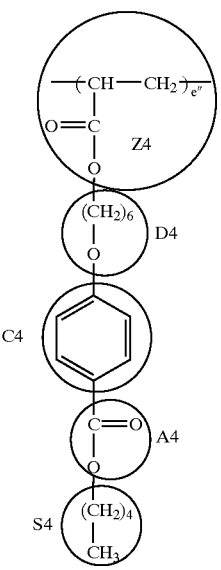

4-II

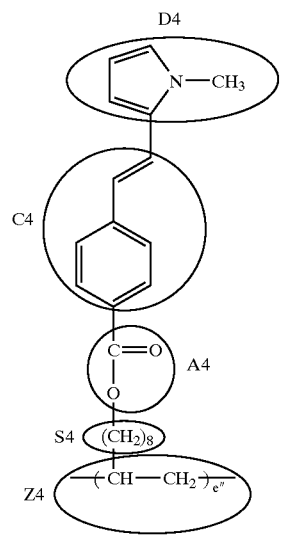

4-III wherein S4, A4, C4, D4, and Z4 are indicated.

* * * * *